(12) United States Patent
Nitta

(10) Patent No.: US 6,930,595 B2
(45) Date of Patent: Aug. 16, 2005

(54) CONTROL SYSTEM AND METHOD FOR ONBOARD EQUIPMENT

(75) Inventor: Ryo Nitta, Ashikaga (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 69 days.

(21) Appl. No.: 10/412,254

(22) Filed: Apr. 14, 2003

(65) Prior Publication Data

US 2003/0193389 A1 Oct. 16, 2003

(30) Foreign Application Priority Data

Apr. 15, 2002 (JP) ........................................ 2002-112011

(51) Int. Cl.[7] .............................................. B60Q 1/00
(52) U.S. Cl. .................... 340/460; 340/692; 340/425.5; 340/525; 340/438; 701/29; 180/271; 434/29
(58) Field of Search ................................ 340/460, 461, 340/425.5, 525, 692, 691.1, 691.2, 463, 438, 439, 958, 996; 701/1, 29, 30, 23, 24, 35, 33, 99; 180/271; 434/10, 29, 62

(56) References Cited

U.S. PATENT DOCUMENTS

| | | | | |
|---|---|---|---|---|
| 5,146,219 | A | * | 9/1992 | Zechnall ................ 340/995.24 |
| 5,410,486 | A | * | 4/1995 | Kishi et al. ................ 701/211 |
| 5,521,580 | A | * | 5/1996 | Kaneko et al. ............. 340/439 |
| 5,850,193 | A | * | 12/1998 | Shimoura et al. ........ 340/995.1 |
| 5,983,161 | A | * | 11/1999 | Lemelson et al. .......... 701/301 |
| 6,275,231 | B1 | | 8/2001 | Obradovich ................. 701/36 |
| 6,703,944 | B1 | | 3/2004 | Obradovich ............... 340/435 |
| 2002/0008718 | A1 | | 1/2002 | Obradovich ............... 345/764 |
| 2002/0054159 | A1 | | 5/2002 | Obradovich ............... 715/839 |
| 2002/0055811 | A1 | | 5/2002 | Obradovich ................. 701/23 |

FOREIGN PATENT DOCUMENTS

| | | |
|---|---|---|
| DE | 199 28 490 | 12/2000 |
| DE | 101 14 433 | 10/2002 |
| JP | 64-18745 | 1/1989 |
| JP | 07-199820 | 8/1995 |
| JP | 09-023122 | 1/1997 |
| JP | 09-044077 | 2/1997 |
| JP | 10-244915 | 9/1998 |
| JP | 11-090038 | 4/1999 |
| JP | 2001-092343 | 4/2001 |

OTHER PUBLICATIONS

"Implementing ADS–B in North Sea," published on Internet at http://www.aatl.net/publications/northsea.htm and downloaded Sep. 20, 2002.

* cited by examiner

*Primary Examiner*—Donnie L. Crosland
(74) *Attorney, Agent, or Firm*—Smith, Gambrell & Russell, LLP

(57) ABSTRACT

A system and method for controlling onboard equipments, which can make a driver certainly understand operations of alarms corresponding to various functions of a vehicle, and which can make the functions of the vehicle give full effects. When drive guide data corresponding to a set vehicle condition and simulated vehicle condition data concerning the set vehicle condition are stored in a memory (700), and a navigation device (400) plays the drive guide data stored in the memory (700), a system control unit (100) makes a vehicle condition advise unit (200) warn a driver of the set vehicle condition by a simulation on the basis of the simulated vehicle condition data. Accordingly, the driver can know an alarm operation of the vehicle condition advise unit corresponding to the set vehicle condition by the simulation.

28 Claims, 7 Drawing Sheets

CONTROL SYSTEM AND METHOD FOR ONBOARD EQUIPMENT

BACKGROUND OF THE INVENTION

1. Field of the Invention

The present invention relates to a system and a method for controlling onboard equipments of a vehicle comprising a vehicle condition alarm for warning a driver of vehicle conditions, particularly to an exact recognition system of the vehicle conditions by simulations.

2. Description of Related Art

Conventionally, for example, a system disclosed in Japanese Patent No. 2587831, is known as the above-described type of a control system for onboard equipments. The control system for the onboard equipments comprises key control sections which can be operated by a driver, a display screen for outputting images thereof, and a navigation device which is connected to an onboard speaker for outputting sounds therefrom. The control system for onboard equipments informs how to use a vehicle, which is stored in a storage medium, and warns the driver of how to use the vehicle, on the basis of operations or the like inputted through the key control sections by the driver.

Recently, the vehicle has various functions such as a function of detecting a danger of a deviation of the vehicle from a lane, detecting a distance from a forward vehicle, keeping dynamic balance when negotiating a curve, or the like. Therefore, various alarms such as a buzzer, a lamp or the like, for warning the driver of operations of the alarms are provided around a passenger seat, corresponding to respective functions.

However, because various functions are provided for the vehicle, there is a problem that the driver cannot understand the operations of the alarms or the like corresponding to the respective functions sufficiently, even if the driver reads through the manual, or the control system for onboard equipments shows explanations of the functions. If the driver does not understand the operations of the alarms or the like sufficiently, when the driver actually drives the car, for example, there is a danger that is a slow and late operation by the driver to prevent the vehicle from deviating from the lane. Accordingly, it is impossible that each operation can not function effectively.

SUMMARY OF THE INVENTION

The present invention was developed in view of the above-described problems.

It is an object of the present invention to provide a system and a method for controlling onboard equipments, which can make a driver exactly understand grasping operations by informations corresponding to various functions of a vehicle, and each function can work effectively.

In order to attain the above-described object, in accordance with a first aspect of the present invention, a control system for an onboard equipment, comprises: a vehicle condition advice unit for advising a driver of a vehicle condition; and a simulated advise control unit for making the vehicle condition advise unit inform the driver of a set vehicle condition by a simulation.

Vehicle conditions include not only a vehicle speed, the remaining amount of fuel, an engine speed or the like, but also a danger that the vehicle deviates from a lane, the condition that the vehicle approaches an object near the vehicle, the condition that a condition control device of the vehicle operates, the condition that a brake control device of the vehicle operates or the like.

According to the system of the first aspect of the present invention, the simulated advise control unit makes the vehicle condition advise unit advise the driver of the set vehicle condition by the simulation. Therefore, the driver confirms an operation of the vehicle condition advise unit corresponding to the set vehicle condition.

Consequently, because the driver can know an actual informed operation from the vehicle condition advise unit corresponding to the set vehicle condition by the simulation, the driver can understand the actual operation of the vehicle condition advise unit concerning each function of the vehicle. That is, because the driver can drive the vehicle accurately, on the basis of the operation of the vehicle condition advise unit, when driving the vehicle actually, it is possible to certainly make each function provided for the vehicle give full effects.

In accordance with a second aspect of the present invention, a control system for an onboard equipment, comprises: a vehicle condition advise unit for informing a driver of a vehicle condition; a play back unit for playing back data stored in a memory to inform the driver, the memory for storing drive guide data corresponding to a set vehicle condition, and simulated vehicle condition data concerning the set vehicle condition; and a simulated advise control unit for making the vehicle condition advise unit inform the driver of the set vehicle condition by a simulation on the basis of the simulated vehicle condition data when the play back unit executes the drive guide data stored in the memory.

According to the system of the second aspect of the present invention, when the play back unit plays the drive guide data stored in the memory, the driver is informed of the drive guide data through the play back unit. Therefore, the driver understands the set vehicle condition on the basis of the drive guide data.

Further, the simulated advise control unit makes the vehicle condition advise unit inform the driver of the set vehicle condition by the simulation. Therefore, the driver understands the operation of the vehicle condition advise unit corresponding to the set vehicle condition.

Consequently, because the driver can understand the set vehicle condition, and know the advise operation of the vehicle condition advise unit corresponding to the set vehicle condition by the simulation, the driver can certainly understand the operation of the vehicle condition advise unit concerning each function of the vehicle. That is, because the driver can drive the vehicle accurately, on the basis of the operation of the vehicle condition advise unit, when driving the vehicle actually, it is possible to certainly make each function provided for the vehicle give full effects.

Preferably, the control system of the second aspect of the present invention, further comprises: a drive operation unit operated by the driver; and an operation detecting unit for detecting an operation condition of the drive operation unit, wherein the simulated advise control unit makes the vehicle condition advise unit inform the driver of the set vehicle condition by the simulation on the basis of the simulated vehicle condition data and the operation condition detected by the operation detecting unit.

According to the control system, it is possible to obtain the same effect as that of the control system of the second aspect of the present invention. Further, when the play back unit plays the drive guide data stored in the memory, the vehicle condition advise unit informs the driver of the set vehicle condition by the simulation, on the basis of not only the simulated vehicle condition data but also the operation condition that the driver operates the drive operation unit. That is, when the driver operates the drive operation unit by himself, he understands the operation of the vehicle condition advise unit corresponding to the operation condition of the drive operation unit.

Consequently, because the driver knows the advise operation of the vehicle condition advise unit corresponding to the set vehicle condition by the simulation, and by operating the drive operation unit, it is possible that the driver more certainly understands the operation of the vehicle condition advise unit concerning each function provided for the vehicle.

Preferably, in the control system of the second aspect of the present invention, the vehicle condition advise unit comprises a lane deviation warning unit for informing the driver that the vehicle deviates from a lane.

According to the control system, it is possible to obtain the same effect as that of the control system of the second aspect of the present invention. Further, because the set vehicle condition includes the condition that the vehicle deviates from the lane, the driver understands the condition that the vehicle deviates from the lane, on the basis of the drive guide data played back by the play back unit.

Further, the simulated advice control unit makes the lane deviation warning unit warn the driver that the vehicle deviates from the lane by the simulation. That is, the driver understands the operation of the lane deviation warning unit when the vehicle deviates from the lane.

Consequently, because the driver can know the alarm operation of the lane deviation warning unit when the vehicle deviates from the lane by the simulation, the driver can certainly understand the operation of the lane deviation warning unit as a lane deviation warning function of the vehicle. That is, because the driver can drive the vehicle accurately, on the basis of the operation of the lane deviation warning unit, when driving the vehicle actually, it is possible to certainly prevent the vehicle from deviating from the lane. That is, it is possible to certainly make the lane deviation warning function provided for the vehicle give full effects.

Preferably, in the control system of the second aspect of the present invention, the vehicle condition advise unit comprises a distance informing unit for warning the driver that the vehicle approaches an object near the vehicle.

According to the control system, it is possible to obtain the same effect as that of the control system of the second aspect of the present invention. Further, because the set vehicle condition includes the condition that the vehicle approaches an object near the vehicle, the driver understands the condition that the vehicle approaches the object near the vehicle, on the basis of the drive guide data played back by the play back unit.

Further, the simulated advise control unit makes the distance informing unit warn the driver that the vehicle approaches the object near the vehicle by the simulation. That is, the driver understands the operation of the distance informing unit when the vehicle approaches the object near the vehicle.

Consequently, because the driver can know the alarm operation of the distance informing unit when the vehicle approaches the object near the vehicle by the simulation, the driver can certainly understand the operation of the distance informing unit as a distance warning function thereof. That is, because the driver can drive the vehicle accurately, on the basis of the operation of the distance informing unit, when driving the vehicle actually, it is possible to certainly prevent the vehicle from colliding with the object or the like. That is, it is possible to certainly make the distance warning function provided for the vehicle give full effects.

Preferably, in the control system of the second aspect of the present invention, the vehicle condition advise unit comprises a condition control advice unit for warning the driver that a condition control device of the vehicle operates.

According to the control system, it is possible to obtain the same effect as that of the control system of the second aspect of the present invention. Further, because the set vehicle condition includes the condition that the condition control device of the vehicle operates, the driver understands the condition that the condition control device operates, on the basis of the drive guide data played back by the play back unit.

Further, the simulated advise control unit makes the condition control advise unit warn the driver that the condition control device of vehicle operates by the simulation. That is, the driver understands the operation of the condition control advise unit when the condition control device operates.

Consequently, because the driver can know the advise operation of the condition control advise unit when the condition control device operates by the simulation, the driver can certainly understand the operation of the condition control advise unit as a condition control function of the vehicle. That is, because the driver can drive the vehicle accurately, on the basis of the operation of the condition control function, when driving the vehicle actually, it is possible that the driver makes the vehicle run along a curve or the like, smoothly. That is, it is possible to certainly make the condition control function give full effects.

Preferably, in the control system of the second aspect of the present invention, the vehicle condition advise unit comprises a brake control alarm unit for warning the driver that a brake control device operates.

According to the control system, it is possible to obtain the same effect as that of the control system of the second aspect of the present invention. Further, because the set vehicle condition includes the condition that the brake control device operates, the driver understands the condition that the brake control device operates, on the basis of the drive guide data played back by the play back unit.

Further, the simulated advise control unit makes the brake control alarm unit warn the driver that the brake control device operates by the simulation. That is, the driver knows that the brake control alarm unit is operated.

Consequently, because the driver can know the alarm operation of the brake control alarm unit when the brake control device is operated by the simulation, the driver can certainly know the operation of the brake control alarm unit as a brake control function thereof. That is, because the driver can drive the vehicle accurately, on the basis of the operation of the brake control function, when driving the vehicle actually, it is possible that the driver certainly avoids a critical situation or the like, at a sudden brake operation. That is, it is possible to certainly make the brake control function give full effects.

Preferably, in the control system of the second aspect of the present invention, the vehicle condition advise unit comprises a meter display unit for being visually confirmed by the driver.

According to the control system, it is possible to obtain the same effect as that of the control system of the second aspect of the present invention. Further, because the set vehicle condition includes the condition of the speed, the engine speed or the like, the driver knows the vehicle speed, the engine speed or the like, on the set vehicle condition, on the basis of the drive guide data by the play back unit.

Further, the simulated advise control unit makes the meter display unit warn the driver of the vehicle speed, the engine speed of the like by the simulation. Therefore, the driver can know the display operation.

Consequently, because the driver can know the display operation of the meter display unit when the vehicle runs by the simulation, the driver can certainly understand the operation of the meter display unit. That is, the driver can drive the vehicle accurately on the basis of the data displayed on the meter display unit when driving the vehicle actually.

Preferably, in the control system of the second aspect of the present invention, the play back unit comprises an image display back unit, the drive guide data include image data, and the play back unit outputs the image based on the image data to the image display back unit.

According to the control system, it is possible to obtain the same effect as that of the control system of the second aspect of the present invention. Further, because the image based on the image data is displayed on the image display back unit when the play back unit plays back the drive guide data stored in the memory, the driver understands the set vehicle condition on the basis of the image. Preferably, for example, an existing onboard equipment such as a screen of a navigation device, is used as the image display back unit.

Consequently, the driver can understand the set vehicle condition visually. Further, because the driver can be warned of the drive guide data by using the existing onboard equipment, it is extremely advantageous for practical uses.

Preferably, in the control system of the second aspect of the present invention, the play back unit comprises a speaker, the drive guide data include sound data, and the play back unit outputs a sound based on the sound data from the speaker.

According to the control system, it is possible to obtain the same effect as that of the control system of the second aspect of the present invention. Further, because the sound based on the sound data is outputted from the speaker when the play back unit plays the drive guide data stored in the memory, the driver understands the set vehicle condition on the basis of the sound. Preferably, for example, an existing onboard equipment such as the speaker which is previously provided for the vehicle, is used as the speaker.

Consequently, the driver can understand the set vehicle condition by hearing the sound. Further, because the driver can be warned of the drive guide data by using the existing onboard equipment, it is extremely advantageous for the practical use.

Preferably, the control system as described above, further comprises: a drive device for making the vehicle a set driving condition on the basis of the operation condition of the drive operation unit; and a simulated operation control unit for controlling the drive device on the basis of the simulated vehicle condition data and for controlling the operation condition of the drive operation unit so as to correspond to the set vehicle condition.

According to the control system, it is possible to obtain the same effect as that of the above-described control system. Further, the simulated operation control unit controls the drive device on the basis of the simulated vehicle condition data, and does the operation condition of the drive operation unit so as to correspond to the set vehicle condition, when the driver is warned of the drive guide data through the play back unit. That is, the driver understands not only the operation of the vehicle condition advise unit corresponding to the set vehicle condition, but also the operation condition of the drive operation unit.

Consequently, the driver can know the operation condition of the drive operation unit corresponding to the set vehicle condition by the simulation. As a result, the driver can know the running condition like the set vehicle condition, accurately, when driving the vehicle actually.

Preferably, in the control system as described above, the drive operation unit comprises a brake pedal, the drive device comprises a brake device for stopping the vehicle on the basis of a pedal operating condition of the brake pedal, and the simulated operation control unit comprises a simulated pedal control unit for controlling the brake device on the basis of the simulated vehicle condition data, and controlling the pedal operating condition so as to correspond to the set vehicle condition.

According to the control system, it is possible to obtain the same effect as that of the above-described control system. Further, the simulated pedal control unit controls the brake device on the basis of the simulated vehicle condition data, and controls the pedal operating condition so as to correspond to the set vehicle condition when the driver is warned of the drive guide data through the play back unit. That is, the driver understands not only the operation of the vehicle condition advise unit corresponding to the set vehicle condition, but also the pedal operating condition.

Consequently, the driver can know the pedal operating condition corresponding to the set vehicle condition by the simulation. As a result, the driver can know the running condition like the set vehicle condition accurately when driving the vehicle actually.

In accordance with a third aspect of the present invention, control method for an onboard equipment of a vehicle with a vehicle condition advise unit for advising a driver of a vehicle condition, comprises the steps of: making the vehicle condition advise unit warn the driver of a set vehicle condition by a simulation; and displaying the condition thereof on a display unit.

According to the method of the third aspect of the present invention, the vehicle condition advise unit advises the driver of the set vehicle condition by the simulation. Therefore, the driver confirms the operation of the vehicle condition advise unit corresponding to the set vehicle condition.

Consequently, because the driver can know the actual informed operation from the vehicle condition advise unit corresponding to the set vehicle condition by the simulation, the driver can certainly understand the actual operation of the vehicle condition advise unit concerning each function of the vehicle. That is, because the driver can drive the vehicle accurately, on the basis of the operation of the vehicle condition advise unit, when driving the vehicle actually, it is possible to certainly make each function provided for the vehicle give full effects.

In accordance with a fourth aspect of the present invention, in a control method for an onboard equipment of a vehicle comprising a vehicle condition advise unit for informing a driver of a vehicle condition by a play back unit for playing back data stored in a memory to inform the driver, wherein the memory stores drive guide data corresponding to a set vehicle condition and simulated vehicle condition data concerning the set vehicle condition, the control method comprises the steps of: making the play back unit display the drive guide data stored in the memory; and making the vehicle condition advise unit inform the driver of the set vehicle condition by a simulation on the basis of the simulated vehicle condition data when performing the making the play back unit display the drive guide data.

According to the method of the fourth aspect of the present invention, when the drive guide data stored in the memory are played by performing the making the play back unit play the drive guide data, the driver is informed of the drive guide data through the play back unit. Therefore, the driver understands the set vehicle condition on the basis of the drive guide data.

Further, the vehicle condition advise unit informs the driver of the set vehicle condition by a simulation, by performing the making the vehicle condition advise unit warn the driver of the set vehicle condition by the simulation. Therefore, the driver understands the operation of the vehicle condition advise unit corresponding to the set vehicle condition.

Consequently, because the driver can understand the set vehicle condition, and know the advice operation of the vehicle condition advise unit corresponding to the set vehicle condition by the simulation, the driver can certainly understand the operation of the vehicle condition advise unit concerning each function of the vehicle. That is, because the driver can drive the vehicle accurately, on the basis of the operation of the vehicle condition advise unit, when driving the vehicle actually, it is possible to certainly make each function provided for the vehicle give full effects.

Preferably, the control method of the fourth aspect of the present invention, further comprises: determining whether to make the play back unit display the drive guide data on the basis of a set determination condition.

According to the control method, it is possible to obtain the same effect as that of the control method of the fourth aspect of the present invention. Further, in case the determination condition is satisfied, the driver is warned of the drive guide data through the play back unit, by performing the making the play back unit play the drive guide data. Thereafter, the driver is warned of the set vehicle condition through the vehicle condition advise unit, by performing the making the vehicle condition advise unit warn the driver of the set vehicle condition by the simulation.

Consequently, because the determination condition is previously determined, it is possible to properly warn the driver of the drive guide data and the set vehicle condition, by necessity.

Preferably, in the control method of the fourth aspect of the present invention, the vehicle further comprises a drive operation unit operated by the driver, and an operation detecting unit for detecting an operation condition of the drive operation unit, and the control method further comprises making the vehicle condition advise unit inform the driver of the set vehicle condition by the simulation on the basis of the operation condition detected by the operation detecting unit, when performing the making the play back unit play the drive guide data and playing the drive guide data.

According to the control method, it is possible to obtain the same effect as that of the control method of the fourth aspect of the present invention. Further, when the drive guide data stored in the memory are played when performing the making the play back unit play the drive guide data, the vehicle condition advise unit informs the driver of the set vehicle condition by the simulation, on the basis of the operation condition that the driver operates the drive operation unit when performing the making the vehicle condition advise unit warn the driver of the set vehicle condition by the simulation. That is, when the driver operates the drive operation unit by himself, he understands the operation of the vehicle condition advise unit corresponding to the operation condition of the drive operation unit.

Consequently, because the driver knows the advise operation of the vehicle condition advise unit corresponding to the set vehicle condition by the simulation, and by operating the drive operation unit, it is possible that the driver more certainly understands the operation of the vehicle condition advise unit concerning each function provided for the vehicle.

Preferably, the control method as described above, further comprises: selecting any one of a first control step comprising the making the play back unit play the drive guide data, a second control step comprising the making the play back unit play the drive guide data and the making the vehicle condition advise unit warn the driver of the set vehicle condition by a simulation on the basis of the simulated vehicle condition data, and a third control step comprising the making the play back unit play the drive guide data, the making the vehicle condition advise unit warn the driver of the set vehicle condition by a simulation on the basis of the simulated vehicle condition data and the making the vehicle condition advise unit warn the driver of the set vehicle condition by the simulation on the basis of the operation condition, on the basis of a set selecting condition.

According to the control method, it is possible to obtain the same effect as that of the above-described control method. Further, it is possible to select any one of the first control step for warning the driver of only the drive guide data, the second control step for not only warning the driver of the drive guide data but also warning the driver of the set vehicle condition on the basis of the simulated vehicle condition data, and the third control step for not only warning the driver of the drive guide data and warning the driver of the set vehicle condition on the basis of the simulated vehicle condition data but also warning the driver of the set vehicle condition on the basis of the operation condition of the drive operation unit, on the basis of the predetermined selecting condition.

Consequently, in case it is sufficient to warn the driver of only the drive guide data, when the first control step is selected, it is possible to omit the making the vehicle condition advise unit warn the driver of the set vehicle condition, as a simulation, on the basis of the simulated vehicle condition data, and the making the vehicle condition advise unit warn the driver of the set vehicle condition, as the simulation, on the basis of the operation condition, on the basis of a predetermined selecting condition. As a result, it is extremely useful in putting to practical.

Preferably, in the control method of the fourth aspect of the present invention, the vehicle condition advise unit comprises a lane deviation warning unit for informing the driver that the vehicle deviates from a lane, and the making the vehicle condition advise unit warn the driver of the set vehicle condition by a simulation on the basis of the simulated vehicle condition data includes making the lane deviation warning unit inform the driver of the set vehicle condition by the simulation on the basis of the simulated vehicle condition data.

According to the control method, it is possible to obtain the same effect as that of the control method of the fourth aspect of the present invention. Further, because the set vehicle condition includes the condition that the vehicle deviates from the lane, the driver understands the condition that the vehicle deviates from the lane, on the basis of the drive guide data played by performing the making the play back unit play back the drive guide data.

Further, the lane deviation warning unit warns the driver that the vehicle deviates from the lane by the simulation, by performing the making the lane deviation warning unit warn the driver of the set vehicle condition as the simulation, on the basis of the simulated vehicle condition data. That is, the driver understands the operation of the lane deviation warning unit when the vehicle deviates from the lane.

Consequently, because the driver can know the alarm operation of the lane deviation warning unit when the vehicle deviates from the lane by the simulation, the driver can certainly understand the operation of the lane deviation warning unit as the lane deviation warning function of the vehicle. That is, because the driver can drive the vehicle accurately, on the basis of the operation of the lane deviation warning unit, when driving the vehicle actually, it is possible to certainly prevent the vehicle from deviating from the lane. That is, it is possible to certainly make the lane deviation warning function provided for the vehicle give full effects.

Preferably, in the control method of the fourth aspect of the present invention, the vehicle condition advise unit comprises a distance informing unit for warning the driver that the vehicle approaches an object near the vehicle, and the making the vehicle condition advise unit warn the driver of the set vehicle condition by a simulation, on the basis of the simulated vehicle condition data includes making the distance informing unit warn the driver of the set vehicle condition by the simulation, on the basis of the simulated vehicle condition data.

According to the control method, it is possible to obtain the same effect as that of the control method of the fourth aspect of the present invention. Further, because the set vehicle condition includes the condition that the vehicle approaches an object near the vehicle, the driver understands the condition that the vehicle approaches the object near the vehicle, on the basis of the drive guide data played by performing the making the play back unit play back the drive guide data.

Further, the distance informing unit warns the driver that the vehicle approaches the object near the vehicle, as a simulation, by performing the making the distance informing unit warn the driver of the set vehicle condition by the simulation, on the basis of the simulated vehicle condition data. That is, the driver understands the operation of the distance informing unit when the vehicle approaches the object near the vehicle.

Consequently, because the driver can know the alarm operation of the distance informing unit when the vehicle approaches the object near the vehicle by the simulation, the driver can certainly understand the operation of the distance informing unit as a distance warning function thereof. That is, because the driver can drive the vehicle accurately, on the basis of the operation of the distance informing unit, when driving the vehicle actually, it is possible to certainly prevent the vehicle from colliding with the object or the like. That is, it is possible to certainly make the distance warning function provided for the vehicle give full effects.

Preferably, in the control method of the fourth aspect of the present invention, the vehicle condition advise unit comprises a condition control advise unit for warning the driver that a condition control device of the vehicle operates, and the making the vehicle condition advise unit warn the driver of the set vehicle condition by a simulation, on the basis of the simulated vehicle condition data includes making the condition control advise unit warn the driver of the set vehicle condition by the simulation, on the basis of the simulated vehicle condition data.

According to the control method, it is possible to obtain the same effect as that of the control method of the fourth aspect of the present invention. Further, because the set vehicle condition includes the condition that the condition control device operates, the driver understands the condition that the condition control device of the vehicle operates, on the basis of the drive guide data played by performing the making the play back unit play back the drive guide data.

Further, the condition control advise unit warns the driver that the condition control device of vehicle operates by the simulation, by performing the making the condition control advise unit warn the driver of the set vehicle condition by the simulation, on the basis of the simulated vehicle condition data. That is, the driver understands the operation of the condition control advise unit when the condition control device operates.

Consequently, because the driver can know the advise operation of the condition control advise unit when the condition control device operates by the simulation, the driver can certainly understand the operation of the condition control advise unit as a condition control function of the vehicle. That is, because the driver can drive the vehicle accurately, on the basis of the operation of the condition control function, when driving the vehicle actually, it is possible that the driver makes the vehicle run along a curve or the like, smoothly. That is, it is possible to certainly make the condition control function give full effects.

Preferably, in the control method of the fourth aspect of the present invention, the vehicle condition advise unit comprises a brake control alarm unit for warning the driver that a brake control device of the vehicle operates, and the making the vehicle condition advise unit warn the driver of the set vehicle condition by a simulation, on the basis of the simulated vehicle condition data includes making the brake control alarm unit warn the driver of the set vehicle condition by the simulation, on the basis of the simulated vehicle condition data.

According to the control method, it is possible to obtain the same effect as that of the control method of the fourth aspect of the present invention. Further, because the set vehicle condition includes the condition that the brake control device operates, the driver understands the condition that the brake control device operates, on the basis of the drive guide data played by performing the making the play back unit play back the drive guide data.

Further, the brake control alarm unit warns the driver that the brake control device operates by the simulation, by performing the making the brake control alarm unit warn the driver of the set vehicle condition by the simulation, on the basis of the simulated vehicle condition data. That is, the driver knows that the brake control alarm unit is operated.

Consequently, because the driver can know the alarm operation of the brake control alarm unit when the brake control device is operated by the simulation, the driver can certainly know the operation of the brake control alarm unit as a brake control function thereof. That is, because the driver can drive the vehicle accurately, on the basis of the operation of the brake control function, when driving the vehicle actually, it is possible that the driver certainly avoids a critical situation or the like, at a sudden brake operation. That is, it is possible to certainly make the brake control function give full effects.

Preferably, in the control method of the fourth aspect of the present invention, the vehicle condition advise unit comprises a meter display unit for being visually confirmed by the driver, and the making the vehicle condition advise unit warn the driver of the set vehicle condition by a simulation, on the basis of the simulated vehicle condition data includes making the meter display unit warn the driver of the set vehicle condition by the simulation, on the basis of the simulated vehicle condition data.

According to the control method, it is possible to obtain the same effect as that of the control method of the fourth aspect of the present invention. Further, because the set vehicle condition includes the condition of the speed, the engine speed or the like, the driver knows the vehicle speed, the engine speed or the like on the set vehicle condition, on the basis of the drive guide data played by performing the making the play back unit play the drive guide data.

Further, the meter display unit warns the driver of the vehicle speed, the engine speed of the like by the simulation, by performing the making the meter display unit warn the driver of the set vehicle condition by the simulation, on the basis of the simulated vehicle condition data. Therefore, the driver can know the display operation.

Consequently, because the driver can know the display operation of the meter display unit when the vehicle runs by the simulation, the driver can certainly understand the operation of the meter display unit. That is, the driver can drive the vehicle accurately on the basis of the data displayed on the meter display unit.

Preferably, in the control method of the fourth aspect of the present invention, the play back unit comprises an image display unit, the drive guide data include image data, and the making the play back unit play the drive guide data includes outputting the image data stored in the memory to the image display back unit.

According to the control method, it is possible to obtain the same effect as that of the control method of the fourth aspect of the present invention. Further, because the image based on the image data is displayed on the image display back unit, by performing the outputting the image data stored in the memory, which is included in the making the play back unit play back the drive guide data, the driver understands the set vehicle condition on the basis of the image. Preferably, for example, an existing onboard equipment such as a screen of a navigation device, is used as the image display back unit.

Consequently, the driver can understand the set vehicle condition visually. Further, because the driver can be warned of the drive guide data by using the existing onboard equipment, it is extremely advantageous for practical uses.

Preferably, in the control method of the fourth aspect of the present invention, the play back unit comprises a speaker, the drive guide data include sound data, and the making the play back unit play the drive guide data includes outputting the sound data stored in the memory from the speaker.

According to the control method, it is possible to obtain the same effect as that of the control method of the fourth aspect of the present invention. Further, because the sound based on the sound data is outputted from the speaker, by performing the outputting the sound data stored in the memory, which is included in the making the play back unit play the drive guide data, the driver understands the set vehicle condition on the basis of the sound. Preferably, for example, an existing onboard equipment such as the speaker which is previously provided for the vehicle, is used as the speaker.

Consequently, the driver can understand the set vehicle condition by hearing the sound. Further, because the driver can be warned of the drive guide data by using the existing onboard equipment, it is extremely advantageous for the practical use.

Preferably, in the control method as described above, the vehicle further comprises a drive device for making the vehicle a set driving condition on the basis of the operation condition of the drive operation unit, and the control method comprises controlling the drive device on the basis of the simulated vehicle condition data and for controlling the operation condition of the drive operation unit so as to correspond to the set vehicle condition, when performing the making the play back unit play the drive guide data and playing the drive guide data.

According to the control method, it is possible to obtain the same effect as that of the above-described control method. Further, the drive device is controlled on the basis of the simulated vehicle condition data, and the operation condition of the drive operation unit is controlled so as to correspond to the set vehicle condition, by performing the controlling the drive device on the basis of the simulated vehicle condition data, and controlling the operation condition of the drive operation unit so as to correspond to the set vehicle condition, when the driver is warned of the drive guide data by performing the making the play back unit play the drive guide data. That is, the driver understands not only the operation of the vehicle condition advise unit corresponding to the set vehicle condition, but also the operation condition of the drive operation unit.

Consequently, the driver can know the operation condition of the drive operation unit corresponding to the set vehicle condition by the simulation. As a result, the driver can know the running condition like the set vehicle condition, accurately, when driving the vehicle actually.

Preferably, in the control method as described above, the drive operation unit comprises a brake pedal, the drive device comprises a brake device for stopping the vehicle on the basis of a pedal operating condition of the brake pedal, and the controlling the drive device comprises controlling the brake device on the basis of the simulated vehicle condition data, and controlling the pedal operating condition so as to correspond to the set vehicle condition, when performing the making the play back unit play the drive guide data and playing the drive guide data.

According to the control method, it is possible to obtain the same effect as that of the above-described control method. Further, the brake device is controlled on the basis of the simulated vehicle condition data, and the pedal operating condition is controlled so as to correspond to the set vehicle condition, by performing the controlling the brake device on the basis of the simulated vehicle condition data, and controlling the pedal operating condition so as to correspond to the set vehicle condition, when the driver is warned of the drive guide data by performing the making the play back unit play the drive guide data. That is, the driver understands not only the operation of the vehicle condition advise unit corresponding to the set vehicle condition, but also the pedal operating condition.

Consequently, the driver can know the pedal operating condition corresponding to the set vehicle condition, by the simulation. As a result, the driver can know the running condition like the set vehicle condition accurately when driving the vehicle actually.

In accordance with a fifth aspect of the present invention, a control method for an onboard equipment of a vehicle, comprises: warning a driver of a vehicle condition; and warning the driver of a set vehicle condition by a simulation.

In accordance with a sixth aspect of the present invention, a control method for an onboard equipment of a vehicle, comprises: warning a driver of a vehicle condition; playing data stored in a memory to warn the driver, the memory for storing drive guide data corresponding to a set vehicle condition and simulated vehicle condition data concerning the set vehicle condition; and warning the driver of the set vehicle condition by a simulation on the basis of the simulated vehicle condition data, when playing the drive guide data stored in the memory.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein.

PREFERRED EMBODIMENTS OF THE INVENTION

Figure 1:
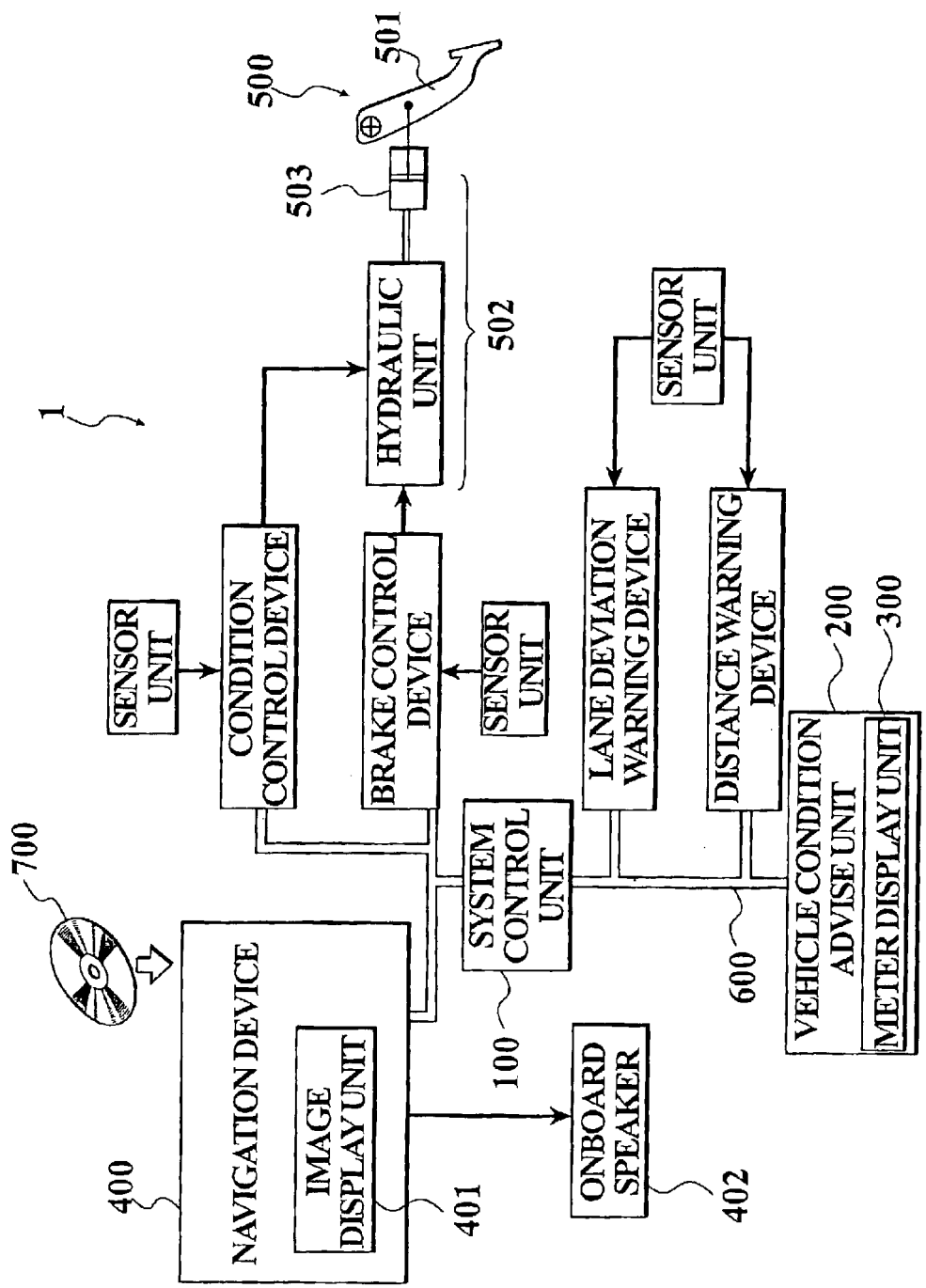
FIG. 1 is a schematic block diagram showing a structure of a control system for onboard equipments according to an embodiment of the present invention.
Figure 2:
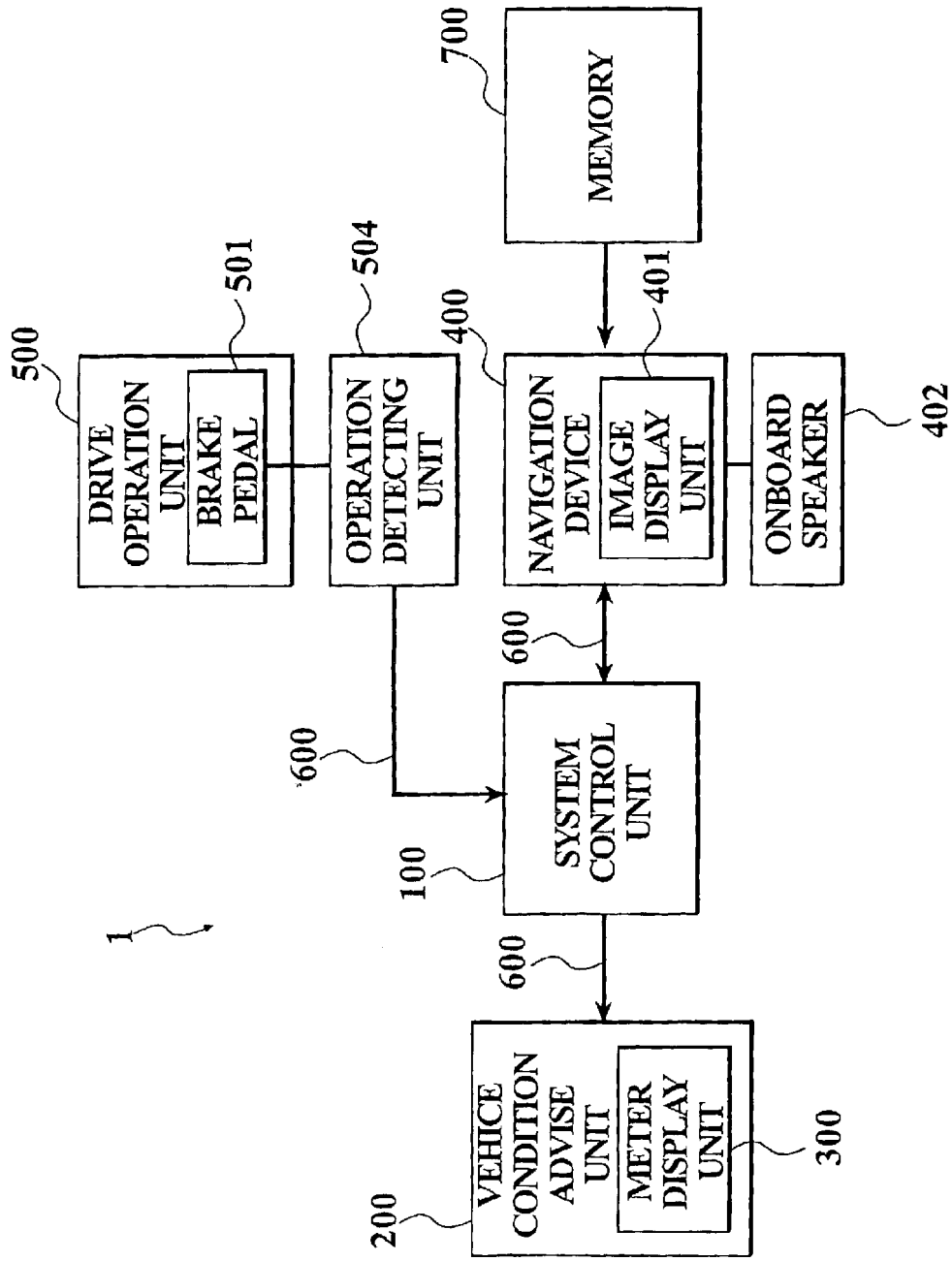
FIG. 2 is the schematic block diagram showing the structure of the control system for the onboard equipments.
Figure 3:
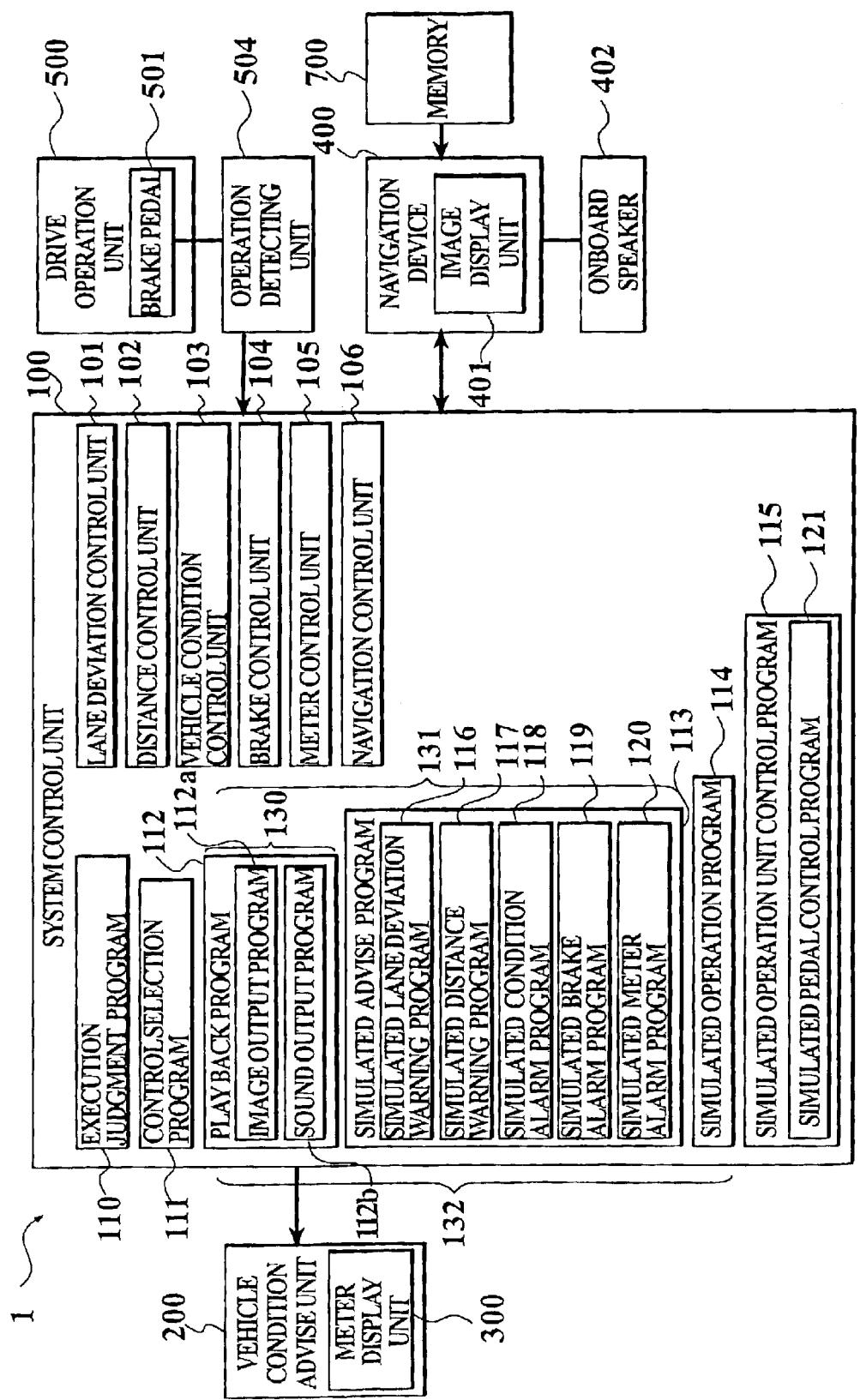
FIG. 3 is the schematic block diagram showing a system control unit of the structure of the control system for the onboard equipments.
Figure 4:
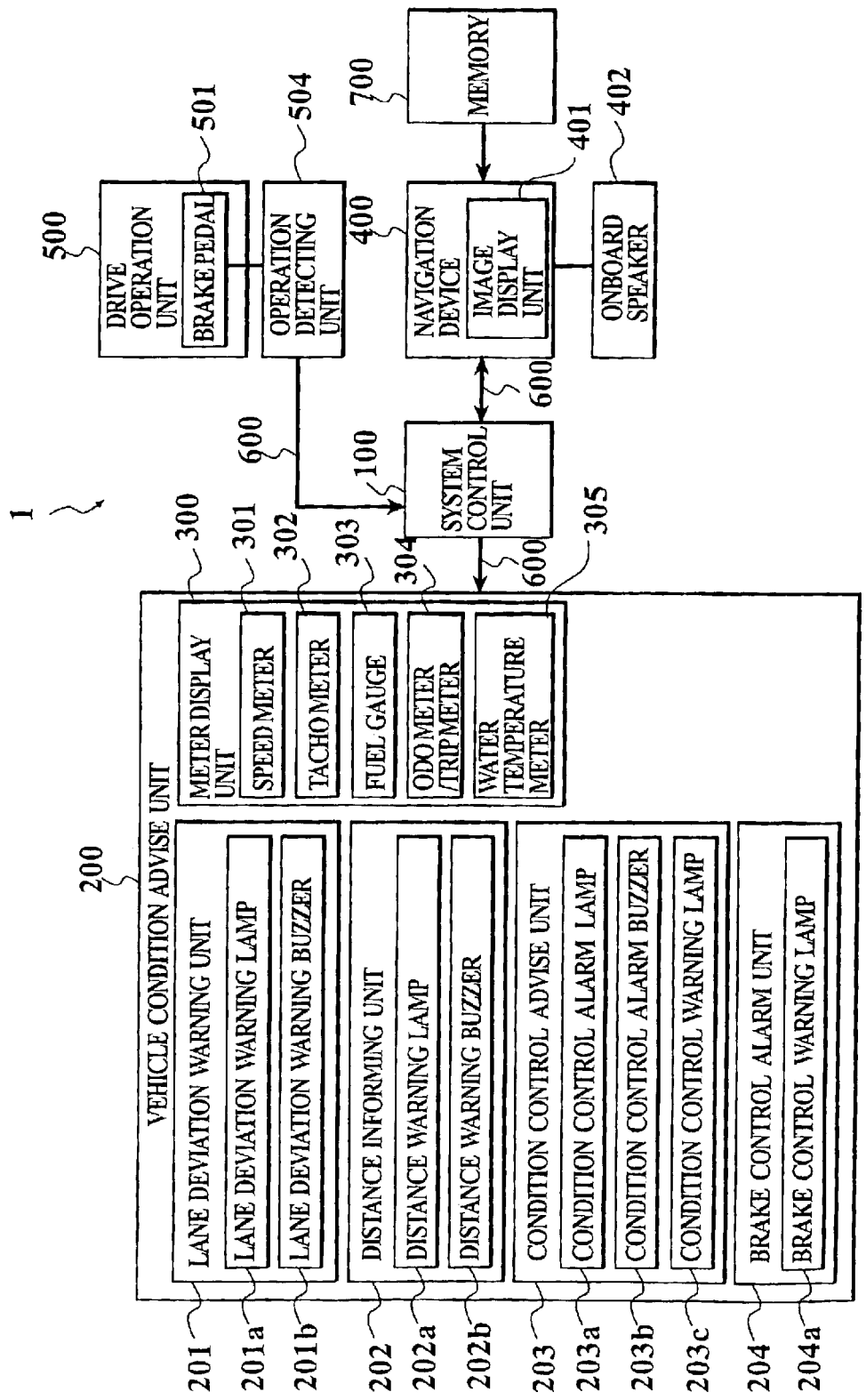
FIG. 4 is the schematic block diagram showing a vehicle condition display unit of the structure of the control system for the onboard equipments.
Figure 5:
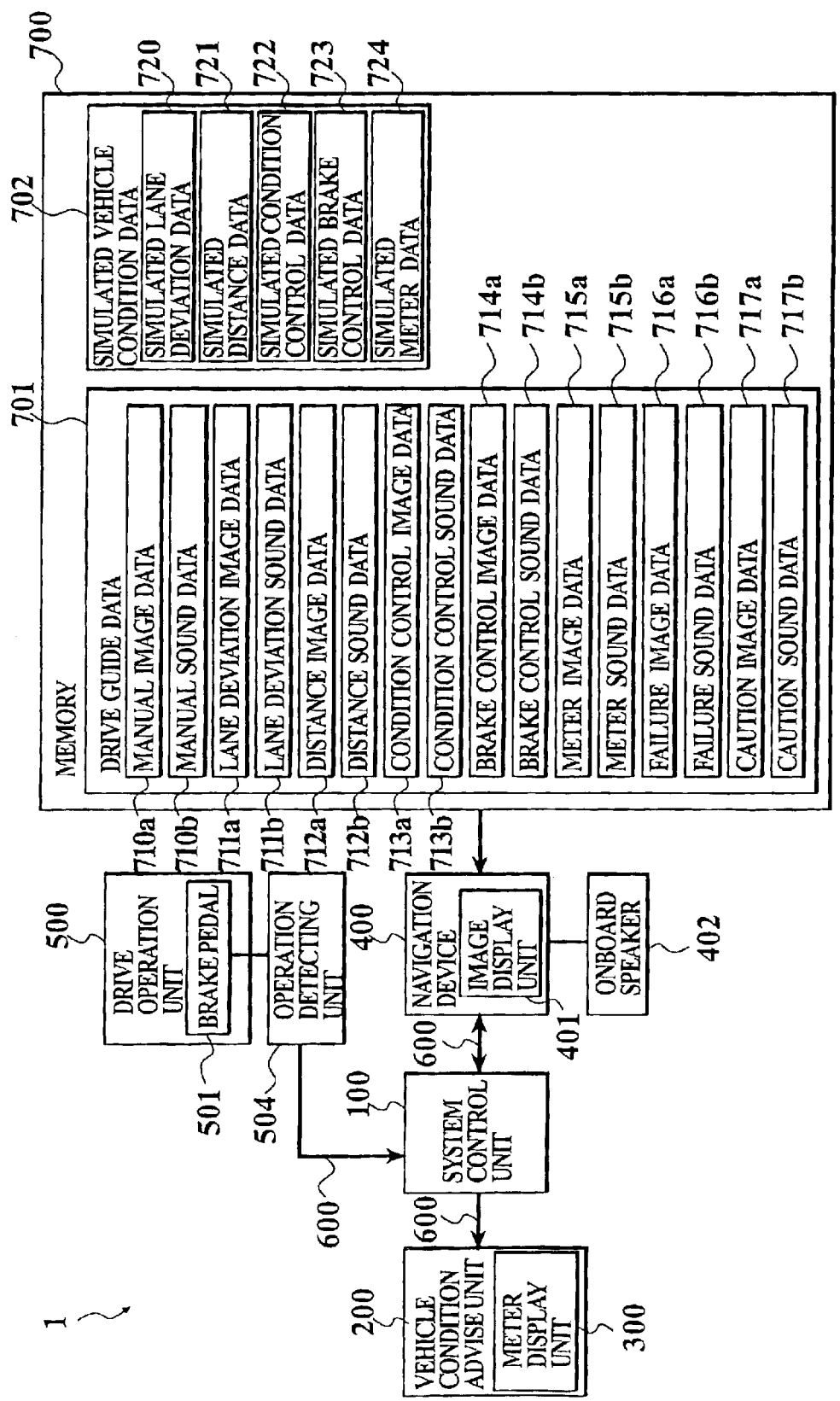
FIG. 5 is the schematic block diagram showing a memory of the structure of the control system for the onboard equipments.
Figure 6:
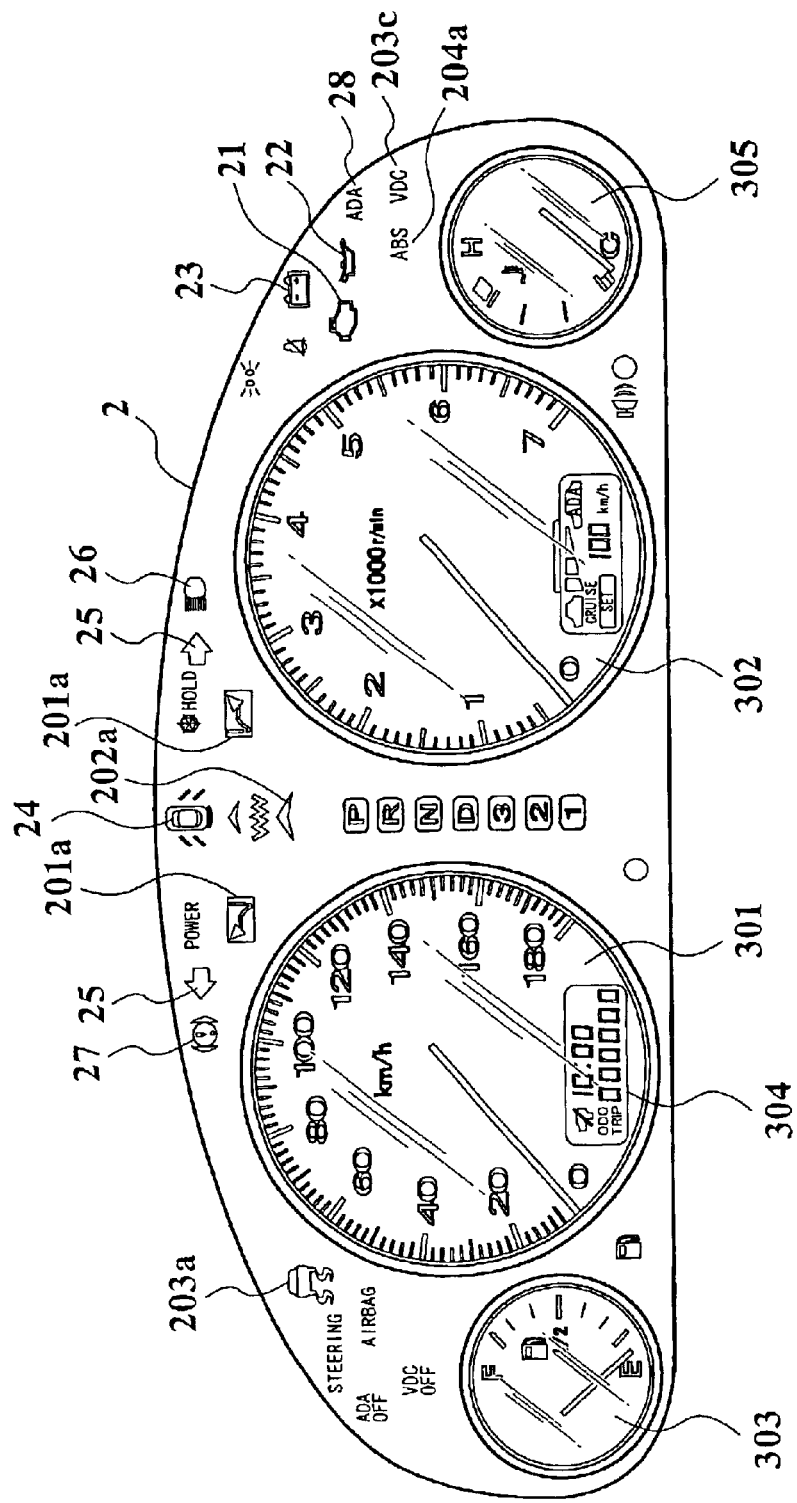
FIG. 6 is a front view of a combination panel of a vehicle.
Figure 7:
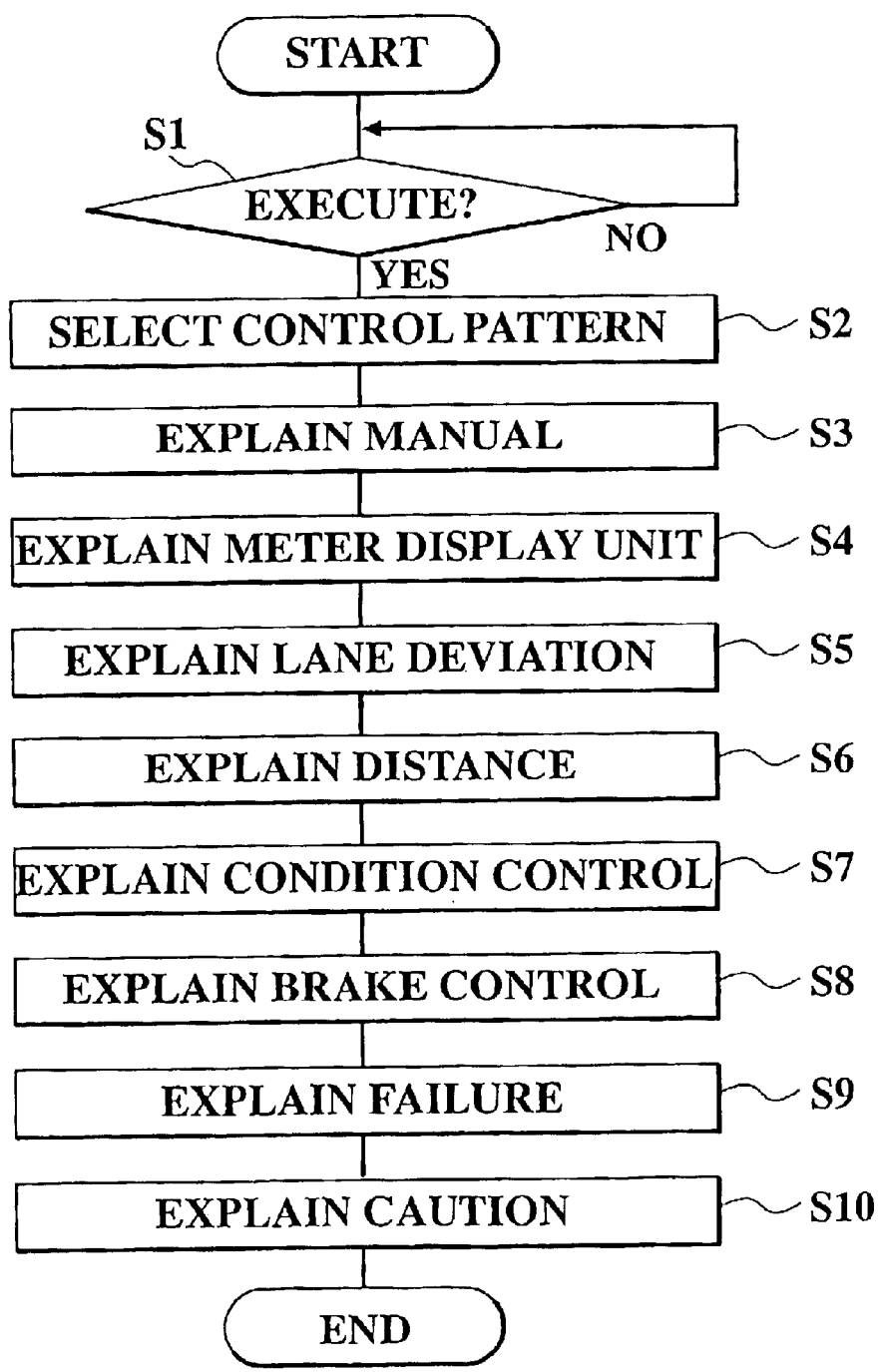
FIG. 7 is a flow chart showing an operation of a system control unit of the control system for onboard equipments.

FIGS. 1 to 7 are views showing an embodiment of the present invention. FIG. 1 is a schematic block diagram showing a structure of a control system for onboard equipments. FIGS. 2 to 5 are schematic block diagrams showing functions of the control system for the onboard equipments. FIG. 6 is a front view of a combination panel of a vehicle. FIG. 7 is a flow chart showing an operation of a system control unit of the control system for the onboard equipments. FIGS. 2 to 5 are the same block diagrams, and FIG. 3 is a block diagram showing the system control unit in detail. FIG. 4 is the block diagram showing a vehicle condition advise unit in detail. FIG. 5 is the block diagram showing memory means in detail.

As shown in FIG. 1, the onboard equipment control system 1 comprises a system control unit 100 connected to each onboard equipment for communicating with each other. According to the embodiment, as shown in FIG. 2, a vehicle condition advise unit 200, a navigation device 400, a drive operation unit 500 or the like, is mounted on the vehicle, as the onboard equipment, and connected to the system control unit 100 through a communication line 600. Further, according to the embodiment, the communication line 600 is a LAN (Local Area Network) mounted on the vehicle. The communication line 600 is any one of a wired communication and a radio communication.

As shown in FIG. 3, the system control unit 100 comprises a lane deviation control unit 101, a distance control unit 102, a vehicle condition control unit 103, a brake control unit 104, a meter control unit 105 and a navigation control unit 106. Further, the system control unit 100 stores an execution judgment program 110, a control selection program 111, a play back program 112, a simulated advise program 113, a simulated operation program 114 and a simulated operation unit control program 115.

Herein, each of the control units 101 to 106 will be explained as follows.

The lane deviation control unit 101 is mounted on the vehicle having a lane deviation warning function. That is, when determining that the vehicle deviates from the lane on the basis of data detected by a sensor such as a camera or the like, the lane deviation control unit 101 warns the driver of the lane deviation, by using a lane deviation warning unit 201 of the vehicle condition advise unit 200.

The distance control unit 102 according to the embodiment is mounted on the vehicle having a distance warning function That is, when determining that the vehicle approaches an object near the vehicle, on the basis of the data detected by the sensor such as the camera or the like, the distance control unit 102 warns the driver of the approach to the forward vehicle, by using a distance informing unit 202 of the vehicle condition advise unit 200.

The vehicle condition control unit 103 is mounted on the vehicle having the vehicle condition control function. That is, the vehicle condition control unit 103 determines a running condition of the vehicle, on the basis of the data detected by a vertical acceleration sensor, a speed sensor, a brake pressure sensor, a steering angle sensor or the like, which is mounted on the vehicle. Then, the vehicle condition control unit 103 controls an output of an engine, a power distribution of a differential apparatus, and a brake for each wheel, according to the running condition. Therefore, the vehicle condition control unit 103 controls the yaw moment of the vehicle body. At the time, the vehicle condition control unit 103 warns the driver that a condition control device is operated by using a condition control advise unit 203 of the vehicle condition advise unit 200, and calls attention that the vehicle is in an unstable condition to the driver. In case the condition control device is broken, the condition control advise unit 203 warns the driver that the condition control device is broken.

The brake control unit 104 with a vehicle brake control function is mounted on the vehicle. That is, when determining that each wheel is locked when the brake control device operates, on the basis of the data detected by the sensor or the like, the brake control unit 104 stops the vehicle so that each wheel is not locked by a hydraulic unit. Therefore, it is possible to reduce the braking distance of the vehicle in an emergency. In case the brake control device is broken, a brake control alarm unit 204 of the vehicle condition advise unit 200 warns the driver that the brake control device is broken.

The meter control unit 105 mounted on the vehicle controls the meter display unit 300 which is visually confirmed by the driver on the basis of the data detected by the sensor or the like. Accordingly, it is possible that the driver obtains information on the vehicle speed, the engine speed or the like.

The navigation control unit 106 mounted on the vehicle controls the navigation device 400 on the basis of data obtained through a GPS antenna or the like, and warns the driver of the present position of the vehicle.

The vehicle condition advise unit 200 is provided in the inside of the vehicle to warn the driver of the vehicle condition, as described above. Herein, the vehicle condition includes not only a condition of the speeds, the remaining amount of fuel, or the like, but also a condition that there is in danger that the vehicle can deviate from the line, the condition that the vehicle approaches an object near the vehicle, the operating condition of the condition control device, the condition that the brake control device operates properly or not and so on. According to the embodiment, as shown in FIG. 4, the vehicle condition advise unit 200 comprises a lane deviation warning unit 201, a distance informing unit 202, a condition control advise unit 203, a brake control alarm unit 204 and a meter display unit 300.

The lane deviation warning unit 201 comprises a lane deviation warning lamp 201a provided on a combination panel 2 of a driver's seat, and a lane deviation warning buzzer 201b provided in a passenger compartment of the vehicle. The lane deviation warning unit 201 is connected to the lane deviation control unit 101. When the lane deviation control unit 101 determines that the vehicle deviates from the lane, the lane deviation control unit 101 illuminates the lane deviation warning lamp 201a, and sounds the lane deviation warning buzzer 201b.

The distance informing unit 202 comprises a distance warning lamp 202a which is provided on the combination panel 2, and a distance warning buzzer 202b provided in the compartment of the vehicle. The distance informing unit 202 is connected to the distance control unit 102. When the distance control unit 102 determines that the vehicle approaches the object near the vehicle, the distance control unit 102 illuminates the distance warning lamp 202a, and sounds the distance warning buzzer 202b.

The condition control advise unit 203 comprises a condition control alarm lamp 203a provided on the combination panel 2, and a condition control alarm buzzer 203b provided in the compartment. The condition control advise unit 203 is connected to the vehicle condition control unit 103. The vehicle condition control unit 103 illuminates the condition control alarm lamp 203a, and sounds the condition control alarm buzzer 203b, when controlling the vehicle.

Further, the condition control advise unit 203 further comprises a condition control warning lamp 203c. The condition control advise unit 203 is connected to the vehicle condition control unit 103. The vehicle condition control unit 104 illuminates the condition control warning lamp 203c, in case the condition control device is broken.

The brake control alarm unit 204 comprises a brake control warning lamp 204a on the combination panel 2. The brake control alarm unit 204 is connected to the brake control unit 104. The brake control unit 104 illuminates the brake control warning lamp 204a, in case the brake control device is broken.

The meter display unit 300 is provided on the combination panel 2. The meter display unit 300 comprises a speed meter 301 for displaying the speed thereof, a tachometer 302 for displaying the rotation number of the engine thereon, a fuel gauge 303 for displaying the remaining amount of the fuel thereon, an odometer/tripmeter 304 for displaying an accumulated running distance, a designated running distance or the like thereon, and a water temperature meter 305 for displaying a temperature of an engine cooling water thereon.

Herein, as shown in FIG. 6, not only the above-described warning lamps 201a, 202a and 203c and 204a and the above-described alarm lamp 203a, but also an engine check warning lamp 21 for illuminating when an engine control unit is abnormal, an oil pressure warning lamp 22 for illuminating when a pressure of an engine oil drops, a charge warning lamp 23 for illuminating when a battery charge system is abnormal, an unclosed door warning lamp 24 for illuminating when a door is not completely closed, a turn signal alarm lamp 25 for displaying an operation of a turn signal, a high beam alarm lamp 26 for displaying an upward condition of a head light, a brake warning lamp 27 for displaying an operation of a parking brake, or the like, is provided on the combination panel 2 of the vehicle. Further, a drive assist warning lamp 28 for displaying that a camera or the like, used by the lane deviation control unit 101 and the distance control unit 102, is broken, is provided on the combination panel 2.

The navigation device 400 displays the data stored in the memory 700 such as a DVD (Digital Versatile Disc), a CD (Compact Disc), or the like, in order to warn the driver of the data. According to the embodiment, because the memory 700 is required to store a large quantity of data concerning images, sounds or the like, it is preferable that the memory 700 is a DVD. As shown in FIGS. 1 and 2, the navigation device 400 comprises an image display unit 401 for outputting an image thereon. The image display unit 401 is connected to an onboard speaker 402 for outputting a sound therefrom. Therefore, it is possible to warn the driver of the data stored in the memory 700, according to the visual means and the audio means. That is, according to the embodiment, the image display unit 401 and the onboard speaker 402 compose the play back unit. The navigation device 400 may comprise an exclusive speaker, instead of the onboard speaker 402 to which the navigation device 400 is connected.

The memory 700 according to the embodiment will be explained. According to the embodiment, as shown in FIG. 5, the memory 700 stores drive guide data 701 and simulated vehicle condition data 702.

The drive guide data 701 correspond to the set vehicle condition which is previously determined. The drive guide data 701 comprise manual image data 710a, manual sound data 710b, lane deviation image data 711a, lane deviation sound data 711b, distance image data 712a, distance sound data 712b, condition control image data 713a, condition control sound data 713b, brake control image data 714a, brake control sound data 714b, meter image data 715a, meter sound data 715b, failure image data 716a, failure sound data 716b, caution image data 717a and caution sound data 717b.

The manual image data 710a and the manual sound data 710b are image and sound data including an explanation for a general operation of the vehicle, such as an adjusting operation of a seat, a fastening and loosening operation of a seat belt, an opening and closing operation of a door window glass, an actuating and stopping operation of a wiper, a turning on and off operation of a head light, a starting and stopping operation of an engine, or the like. Herein, the manual image data 710a and the manual sound data 710b correspond to each other. That is, when the navigation device 400 displays the manual image data 710a and the manual sound data 710b, for example, the images of the operation units of the vehicle are displayed, and the sounds for explaining the method for the operation units are outputted. Therefore, the images and sounds corresponding to each other are outputted at the same time.

The lane deviation image data 711a and the lane deviation sound data 711b are image data and sound data including an explanation for a state that the vehicle deviates from the lane. The lane deviation image data 711*a* and the lane deviation sound data 711*b* correspond to each other. That is, when the navigation device 400 displays the lane deviation image data 711*a* and the lane deviation sound data 711*b*, the image of the state that the vehicle deviates from the lane while running, the image showing the operating state of the lane deviation warning unit 201 at the time, or the like, is displayed, and the sounds of the explanation corresponding to the image are outputted.

The distance image data 712*a* and the distance sound data 712*b* are image data and sound data including an explanation for a state that the vehicle approaches the object near the vehicle. The distance image data 712*a* and the distance sound data 712*b* correspond to each other. That is, when the navigation device 400 displays the distance image data 712*a* and the distance sound data 712*b*, the image showing the state that the vehicle approaches the object near the vehicle while running, the image showing the operation state of the distance informing unit 202 at the time, or the like, is displayed, and the sounds of the explanation corresponding to the image are outputted.

The condition control image data 713*a* and the condition control sound data 713*b* are the image and sound data including the explanation for the state that the condition control device operates. The condition control image data 713*a* and the condition control sound data 713*b* correspond to each other. That is, when the navigation device 400 displays the condition control image data 713*a* and the condition control sound data 713*b*, the image showing the state that the vehicle is over-steered or an under-steered condition while curving, and skids, the image showing the state the vehicle which skidded runs in a stable condition controlled by the condition control device, the image showing the operation state of the condition control advise unit 203 at the time, or the like, is displayed, and the sounds of the explanation corresponding to the image are outputted. Further, the image showing the operation state of the condition control advise unit 203 when the condition control device is broken, or the like is displayed, and the sounds of the explanation corresponding to the image, or the like is outputted.

The brake control image data 714*a* and the brake control sound data 714*b* are the image and sound data including the explanation for the state that the brake control device operates. The brake control image data 714*a* and the brake control sound data 714*b* correspond to each other. When the navigation device 400 displays the brake control image data 714*a* and the brake control sound data 714*b*, the image showing the state the vehicle is braked when the brake control device operates suddenly, is displayed, and the sounds of the explanation corresponding to the image, or the like is outputted. Further, the image showing the operation state of the brake control alarm unit 204 when the brake control device is broken, or the like is displayed, and the sounds of the explanation corresponding to the image, or the like is outputted.

The meter image data 715*a* and the meter sound data 715*b* are image data and sound data including an explanation for an operation of the meter display unit 300 corresponding to the vehicle state. The meter image data 715*a* and the meter sound data 715*b* correspond to each other. When the navigation device 400 displays the meter image data 715*a* and the meter sound data 715*b*, for example, the image of the vehicle running on the predetermined condition, the image of the meter display unit 300 operating according to the running condition of the vehicle, or the like is displayed, and the sounds of the explanation corresponding to the image, or the like is outputted.

The failure image data 716*a* and the failure sound data 716*b* are the image and sound data including the explanation for the operation when the vehicle is broken. The failure image data 716*a* and the failure sound data 716*b* correspond to each other. When the navigation device 400 displays the failure image data 716*a* and the failure sound data 716*b*, for example, the image showing the state that one unit of the vehicle is broken, the image of the check engine alarm lamp 21, the oil pressure alarm lamp 22, the charge warning lamp 23 or the like, illuminating according to the failure, or the like is displayed, and the sounds of the explanation corresponding to the image, or the like is outputted.

The caution image data 717*a* and the caution sound data 717*b* are the image and sound data including the explanation for cautions on the vehicle manual. The caution image data 717*a* and the caution sound data 717*b* correspond to each other. When the navigation device 400 plays the caution image data 717*a* and the caution sound data 717*b*, for example, the image of the electric system or the fuel system of the vehicle, the image concerning the maintenance of the vehicle, or the like is displayed, and the sounds of the explanation of the notes corresponding to the image, or the like is outputted.

The simulated vehicle condition data 702 relate the set vehicle condition as described above. The simulated vehicle condition data 702 comprise simulated lane deviation data 720, simulated distance data 721, simulated condition control data 722, simulated brake control data 723, and simulated meter data 724.

The drive operation unit 500 comprises a steering wheel (which is not shown in figures.) for operating a steering angle of each front wheel of the vehicle, an accelerator pedal (which is not shown in figures.) for operating the engine speed, a brake pedal 501 for operating the brake, as shown in FIG. 1.

The brake pedal 501 is connected to a master cylinder 503 of a hydraulic circuit 502. That is, the power doubled by pedaling the brake pedal 501 presses a sliding surface of a brake pad. Therefore, the vehicle is stopped. Further, as shown in FIG. 2, the brake pedal 501 is connected to an operation detecting unit 504 for detecting the pedal operating condition. The operation detecting unit 504 is connected to the system control unit 100.

Next, the programs 110 to 121 stored in the system control unit 100 is explained, as follows.

An execution judgment program 110 is a program for determining whether to execute a play back program 112 or not on the basis of the set execution judgment condition. According to the embodiment, the conditions of the speed and the parking brake are used as the execution judgment condition. Therefore, the play back program 112 is executed when the driver keeps the vehicle in the stop state (the speed of the vehicle is "0".), by the parking brake. Further, according to the embodiment, the play back program 112 is executed after a control selection program 111.

The control selection program 111 is a program for selecting any one of a first control pattern 130 (with reference to FIG. 3) consisting of the play back program 112, a second control pattern 131 (with reference to FIG. 3) consisting of the play back program 112 and a simulated advise program 113, and a third control pattern 132 (with reference to FIG. 3) consisting of the play back program 112, the simulated advise program 113 and a simulated operation program 114. Herein, for example, in case the driver can select any one of the control patterns, through the operation panel unit of the navigation device 400, it is possible to determine the control pattern according to the instruction by the driver. Further, in case the frequency of the plays back of the memory 700 is stored, it is possible to determine how much the driver knows the function of the vehicle according to the frequency of the plays back, and select any one of the control patterns.

The play back program 112 is a program for making the navigation device 400 play the drive guide data 701 stored in the memory 700, as shown in FIG. 3. The play back program 112 includes an image output program 112*a* for outputting the image data 710*a*, 711*a*, 712*a*, 713*a*, 714*a*, 715*a*, 716*a*, 717*a*, to the image display unit 401, and a sound output program 112*b* for outputting the sound data 710*b*, 711*b*, 712*b*, 713*b*, 714*b*, 715*b*, 716*b*, 717*b*, to the onboard speaker 402.

The simulated advise program 113 is the program for making the vehicle condition advise unit 200 or the meter display unit 300 warn the driver of the set vehicle condition by the simulation on the basis of the simulated vehicle condition data 702, when the navigation device 400 executes the drive guide data 701. As shown in FIG. 3, the simulated advise program 113 includes a simulated lane deviation warning program 116, a simulated distance warning program 117, a simulated condition alarm program 118, a simulated brake alarm program 119 and a simulated meter alarm program 120.

The simulated lane deviation warning program 116 is the program for making the lane deviation warning unit 201 warn the driver of the set vehicle condition by the simulation, on the basis of the simulated lane deviation data 720 of the simulated vehicle condition data 702.

The simulated distance warning program 117 is the program for making the distance informing unit 202 warn the driver of the set vehicle condition by the simulation, on the basis of the simulated distance data 721 of the simulated vehicle condition data 702.

The simulated condition alarm program 118 is the program for making the condition control advise unit 203 warn the driver of the set vehicle condition by the simulation, on the basis of the simulated condition control data 722 of the simulated vehicle condition data 702.

The simulated brake alarm program 119 is the program for making the brake control alarm unit 204 warn the driver of the set vehicle condition by the simulation, on the basis of the simulated brake control data 723 of the simulated vehicle condition data 702.

The simulated meter alarm program 120 is the program for making the meter display unit 300 warn the driver of the set vehicle condition by the simulation, on the basis of the simulated meter data 724 of the simulated vehicle condition data 702.

The simulated operation program 114 is the program for making the vehicle condition advise unit 200 warn the driver of the set vehicle condition by the simulation, on the basis of the operation condition of the drive operation unit 500, detected by the operation detecting unit 504, when the navigation device 400 executes the drive guide data 701. That is, the system control unit 100 warns the driver of the set vehicle condition by the simulation, on the basis of both of the simulated vehicle condition data 702 and the operation condition of the drive operation unit 500, when the navigation device 400 executes the drive guide data 701, according to the simulated advise program 113 and the simulated operation program 114. According to the embodiment, the system control unit 100 warns the driver of the set vehicle condition by the simulation, on the basis of the operation condition of the brake pedal 501 of the drive operation unit 500.

The simulated operation unit control program 115 includes a simulated pedal control program 121 according to the embodiment. The simulated pedal control program 121 is the program for controlling the brake on the basis of the simulated vehicle condition data 702, and controlling the pedal operating condition of the brake pedal 501 so as to correspond to the set vehicle state, when the navigation device 400 executes the drive guide data 701.

The control method for onboard equipments performed by the system control unit 100 having the above-described structure, is explained with reference to the flow chart shown in FIG. 7.

First, the system control unit 100 determines whether to execute the play back program 112, or not, according to the execution judgment program 110 (Step S1). According to the embodiment, the Step S1 corresponds to determining whether to execute to make the play back unit execute the drive guide data. When determining not to execute the play back program 112 (Step S1; NO), the process returns to the Step S1, and the system control unit 100 waits to start the process. When determining to execute the play back program 112 (Step S1; YES), the system control unit 100 selects any one of the first control pattern 130, the second control pattern 131 and the third control pattern 132, to control the drive guide data, according to the control selection program 111 (Step S2). According to the embodiment, the Step S2 corresponds to the selecting any one of a first control step, a second control step, and a third control step, on the basis of a predetermined selecting condition.

Then, the navigation device 400 executes the drive guide data 701 stored in the memory 700, according to the play back program 112. More specifically, the navigation device 400 executes the explanation for the manual (Step S3), the explanation for the meter display unit 300 (Step S4), the explanation for the lane deviation warning function (Step S5), the explanation for the distance warning function (Step S6), the explanation for the condition control function (Step S7), the explanation for the brake control function (Step S8), the explanation for the failure of the vehicle (Step S9), and the explanation for the cautions (Step S10), in the order. Hereinafter, the steps S3 to S10 will be explained as follows.

In order to explain the manual (Step S3), the navigation device 400 executes the manual image data 710*a* and the manual sound data 710*b*. That is, according to the embodiment, the Step S3 corresponds to the making the play back unit execute the drive guide data. Further, the making the play back unit execute the drive guide data in the Step S3 includes the outputting the image data stored in the memory 700, to the image display back unit, and the outputting the sound data stored in the memory 700 from the speaker.

In order to explain the meter display unit 300 (Step S4), the navigation device 400 executes the meter image data 715*a* and the meter sound data 715*b*. In case the system control unit 100 selects the second control pattern 131 or the third control pattern 132 in the Step S2, the meter display unit 300 operates by the simulation, according to the simulated meter alarm program 120. According to the embodiment, in case the system control unit 100 selects the first control pattern 130, the Step S4 corresponds to the making the play back unit execute the drive guide data. Further, in case the system control unit 100 selects the second control pattern 131 or the third control pattern 132, the Step S4 corresponds to the making the play back unit execute the drive guide data, and the making the vehicle condition advise unit warn the driver of the set vehicle condition by the simulation, on the basis of the simulated vehicle condition data. Further, the making the play back unit execute the drive guide data in the Step S4, includes the outputting the image data stored in the memory, to the image display back unit, and the outputting the sound data stored in the memory, from the speaker, regardless of the control pattern. The making the vehicle condition advise unit warn the driver of the set vehicle condition by the simulation, on the basis of the simulated vehicle condition data in the Step S4, includes the making the meter display unit warn the driver of the set vehicle condition.

In order to explain the lane deviation warning function (Step S5), the navigation device 400 executes the lane deviation image data 711a and the lane deviation sound data 711b. In case the system control unit 100 selects the second control pattern 131 or the third control pattern 132 in the Step S2, the lane deviation warning unit 201 operates by the simulation, according to the simulated lane deviation warning program 116 of the simulated advise program 113. In case the system control unit 100 selects the first control pattern 130, the Step S5 corresponds to the making the play back unit execute the drive guide data. Further, in case the system control unit 100 selects the second control pattern 131 or the third control pattern 132, the Step S5 corresponds to the making the play back unit execute the drive guide data, and the making the vehicle condition advise unit warn the driver of the set vehicle condition by the simulation, on the basis of the simulated vehicle condition data. Further, the making the play back unit execute the drive guide data in the Step S5, includes the outputting the image data stored in the memory, to the image display back unit, and the outputting the sound data stored in the memory, from the speaker, regardless of the control pattern. The making the vehicle condition advise unit warn the driver of the set vehicle condition by the simulation, on the basis of the simulated vehicle condition data in the Step S5, includes the making the lane deviation warning unit warn the driver of the set vehicle condition.

In order to explain the distance warning function (Step S6), the navigation device 400 executes the distance image data 712a and the distance sound data 712b. In case the system control unit 100 selects the second control pattern 131 or the third control pattern 132 in Step S2, the distance informing unit 202 operates by the simulation, according to the simulated distance warning program 117. According to the embodiment, in case the system control unit 100 selects the first control pattern 130, the Step S6 corresponds to the making the play back unit execute the drive guide data. Further, in case the system control unit 100 selects the second control pattern 131 or the third control pattern 132, the Step S6 corresponds to the making the play back unit execute the drive guide data, and the making the vehicle condition advise unit warn the driver of the set vehicle condition by the simulation, on the basis of the simulated vehicle condition data. Further, the making the play back unit execute the drive guide data in the Step S6, includes the outputting the image data stored in the memory, to the image display back unit, and the outputting the sound data stored in the memory from the speaker, regardless of the control pattern. The making the vehicle condition advise unit warn the driver of the set vehicle condition by the simulation, on the basis of the simulated vehicle condition data in the Step S6, includes the making the distance informing unit warn the driver of the set vehicle condition.

In order to explain the condition control alarm function (Step S7), the navigation device 400 executes the condition control image data 713a and the condition control sound data 713b. In case the system control unit 100 selects the second control pattern 131 or the third control pattern 132 in Step S2, the condition control advise unit 203 operates by the simulation, according to the simulated condition alarm program 118 of the simulated advise program 113. In case the system control unit 100 selects the first control pattern 130, the Step S7 corresponds to the making the play back unit execute the drive guide data. Further, in case the system control unit 100 selects the second control pattern 131 or the third control pattern 132, the Step S7 corresponds to the making the play back unit execute the drive guide data, and the making the vehicle condition advise unit warn the driver of the set vehicle condition by the simulation, on the basis of the simulated vehicle condition data. Further, the making the play back unit execute the drive guide data in the Step S7, includes the outputting the image data stored in the memory, to the image display back unit, and the outputting the sound data stored in the memory from the speaker, regardless of the control pattern. The making the vehicle condition advise unit warn the driver of the set vehicle condition by the simulation, on the basis of the simulated vehicle condition data in the Step S7, includes the making the condition control advise unit warn the driver of the set vehicle condition.

In order to explain the brake control alarm function (Step S8), the navigation device 400 executes the brake control image data 714a and the brake control sound data 714b. In case the system control unit 100 selects the second control pattern 131 or the third control pattern 132 in Step S2, the brake control alarm unit 204 operates by the simulation, according to the simulated brake alarm program 119 of the simulated advise program 113. Further, in case the system control unit 100 selects the third control pattern 132 in Step S2, the brake control alarm unit 204 operates by the simulation, on the basis of the operation condition of the brake pedal 501, according to the simulated operation program 114. Further, in only case the system control unit 100 selects the third control pattern 132, the brake pedal 501 operates by the simulation, according to the simulated pedal control program 121 of the simulated operation unit control program 115. According to the embodiment, in case the system control unit 100 selects the first control pattern 130, the Step S8 corresponds to the making the play back unit execute the drive guide data. Further, in case the system control unit 100 selects the second control pattern 131, the Step S8 corresponds to the making the play back unit execute the drive guide data, and the making the vehicle condition advise unit warn the driver of the set vehicle condition by the simulation, on the basis of the simulated vehicle condition data. In case the system control unit 100 selects the third control pattern 132, the Step S8 corresponds to the making the play back unit execute the drive guide data, the making the vehicle condition advise unit warn the driver of the set vehicle condition by the simulation, on the basis of the simulated vehicle condition data, and the controlling the drive device on the basis of the simulated vehicle condition data, and controlling the operation condition of the drive operation unit so as to correspond to the set vehicle condition. Furthermore, the making the play back unit execute the drive guide data in the Step S8, includes the outputting the image data stored in the memory, to the image display back unit, and the outputting the sound data stored in the memory from the speaker, regardless of the control pattern. The making the vehicle condition advise unit warn the driver of the set vehicle condition by the simulation, on the basis of the simulated vehicle condition data in the Step S8, includes the making the brake control alarm unit warn the driver of the set vehicle condition, in case of the second control pattern 131 or the third control pattern 132. Controlling the drive device on the basis of the simulated vehicle condition data, and controlling the operation condition of the drive operation unit so as to correspond to the set vehicle condition in the Step S8, include controlling the brake device on the basis of the simulated vehicle condition data, and controlling the pedal operating condition of the brake pedal so as to correspond to the set vehicle condition.

In order to explain the failure of the vehicle in Step S9, the navigation device 400 executes the failure image data 716*a* and the failure sound data 716*b*. Further, in order to explain the notes in Step S10, the navigation device 400 executes the caution image data 717*a* and the note sound data 717*b*. According to the embodiment, each of the Step S9 and the Step S10 corresponds to the making the play back unit execute the drive guide data. Further, the making the play back unit execute the drive guide data in each of the Step S9 and the Step 10, includes the outputting the image data stored in the memory to the image display back unit, and outputting the sound data stored in the memory from the speaker.

That is, when the navigation device 400 plays the drive guide data 701 stored in the memory 700, in each of the Steps S3 to S10, the driver understands the set vehicle condition in each of the Step S3 to S10, according to the image displayed on the images display back unit 401 and the sounds outputted from the onboard speaker 402.

Further, the vehicle condition advise unit 200 warns the driver of the set vehicle condition by the simulation, in each of the Step S4 to S8, the driver understands the operation of the vehicle condition advise unit 200 corresponding to the set vehicle condition.

Further, the brake control alarm unit 204 warns the driver of the set vehicle condition by the simulation, on the basis of the operation condition that the driver operates the brake pedal 501. That is, the driver operates the brake pedal 501 by himself, and understands the operation of the brake control alarm unit 204 corresponding to the pedal operating condition of the brake pedal 501.

According to the onboard equipment control system 1 or the control method for onboard equipments, because the driver can understand the set vehicle condition and recognize the alarm operation of the vehicle condition advise unit 200 corresponding to the set vehicle condition by the simulation, the driver can certainly understand the operation of the vehicle condition advise unit 200 concerning each function of the vehicle. That is, because the driver can drive the vehicle accurately, on the basis of the operation of the vehicle condition advise unit 200, when driving the vehicle actually, it is possible to certainly make each function provided for the vehicle give full effects.

That is, according to the onboard equipment control system 1 or the control method for onboard equipments in the present embodiment, because the driver can know the alarm operation of the lane deviation warning unit 201 when the vehicle deviates from the lane by the simulation, the driver can certainly understand the operation of the lane deviation warning unit 201 and the lane deviation warning function. That is, because the driver can drive the vehicle accurately, on the basis of the operation of the lane deviation warning unit 201, when driving the vehicle actually, it is possible to certainly prevent the vehicle from deviating from the lane. That is, it is possible to certainly make the lane deviation warning function provided for the vehicle give full effects.

Further, according to the onboard equipment control system 1 or the control method for onboard equipments, because the driver can know the alarm operation of the distance informing unit 202 when the vehicle approaches the object near the vehicle by the simulation, the driver can certainly understand the operation of the distance informing unit 202. That is, because the driver can drive the vehicle accurately, on the basis of the operation of the distance informing unit 202, when driving the vehicle actually, it is possible to certainly prevent the vehicle from colliding with the object or the like. That is, it is possible to certainly make the distance warning function provided for the vehicle give full effects.

Further, according to the onboard equipment control system 1 or the control method for onboard equipments, because the driver can know the alarm operation of the condition control advise unit 203 when the condition control device operates by the simulation, the driver can certainly understand the operation of the condition control advise unit 203 as the condition control function of the vehicle. That is, because the driver can drive the vehicle accurately, on the basis of the operation of the condition control function, when driving the vehicle actually, it is possible that the driver makes the vehicle negotiate the curve or the like, smoothly. That is, it is possible to certainly make the condition control function of the vehicle give full effects.

Further, according to the onboard equipment control system 1 or the control method for onboard equipments, because the driver can know the alarm operation of the brake control alarm unit 204 when the brake control device operates by the simulation, the driver can certainly understand the operation of the brake control alarm unit 204 as the brake control function of the vehicle. That is, because the driver can drive the vehicle accurately, on the basis of the operation of the brake control function, when driving the vehicle actually, it is possible that the driver certainly avoids a critical situation or the like at the sudden brake operation. That is, it is possible to certainly make the brake control function of the vehicle give full effects.

Further, according to the onboard equipment control system 1 or the control method for onboard equipments in the present embodiment, because the driver can know the display operation of the meter display unit 300 when the vehicle runs by the simulation, the driver can certainly understand the operation of the meter display unit 300. That is, the driver can drive the vehicle accurately, on the basis of the data displayed on the meter display unit 300, when driving the vehicle actually.

Further, according to the onboard equipment control system 1 or the control method for onboard equipments, because the driver can know the alarm operation of the vehicle condition advise unit 200 corresponding to the set vehicle condition by the simulation, by operating the brake pedal 501 by himself or herself, the driver can more certainly understand the operation of the vehicle condition advise unit 200 concerning each function of the vehicle.

Further, according to the onboard equipment control system 1 or the control method for onboard equipments, because the drive guide data 701 are outputted on the image display unit 401, the driver can understand the set vehicle condition visually. Further, because the driver can be warned of the drive guide data 701 by using the navigation device 400 as the existing onboard equipment, it is extremely advantageous in putting into practical use.

Further, according to the onboard equipment control system 1 or the control method for onboard equipments, because the drive guide data 701 are outputted from the onboard speaker 402, the driver can understand the set vehicle condition by hearing. Further, because the driver can be warned of the drive guide data 701 by using the onboard speaker 402 as the existing onboard equipment, it is extremely advantageous in putting to practical.

Further, according to the onboard equipment control system 1 or the control method for onboard equipments, the driver can know the pedal operating condition of the brake pedal 501 corresponding to the set vehicle condition by the simulation. As a result, the driver can keep the running condition of the set vehicle condition, accurately, when driving the vehicle actually.

Further, according to the onboard equipment control system 1 or the control method for onboard equipments, when the execution determination condition of the execution judgment program 110 is satisfied, the play back program 112 is performed. Consequently, because the determination condition is previously determined, it is possible to properly warn the driver of the drive guide data 701 and the set vehicle condition as required. Specifically, according to the present embodiment, because the data stored in the memory 700 are played back when the driver stops the vehicle, and the driver can stop the vehicle by the parking brake, there is not case that the drive guide data 701 are outputted to the navigation device 400 while the vehicle runs. As a result, it is extremely advantageous in putting it into the practical use.

Further, according to the onboard equipment control system 1 or the control method for onboard equipments, when the control selection program 111 is performed, it is possible to any one of the first control pattern 130 of warning the driver of only the drive guide data 701, the second control pattern 131 of warning the driver of not only the drive guide data 701 but also the set vehicle condition based on the simulated vehicle condition data 702, and the third control pattern 132 of warning the driver of not only the drive guide data 701 and the set vehicle condition based on the simulated vehicle condition data 702 but also the set vehicle condition based on the operation condition of the drive operation unit 500, on the basis of the predetermined selecting condition. In case it is sufficient to warn the driver of only the drive guide data 701, when the first control pattern 130 is selected, it is possible to omit performing the simulated advise program 113 and the simulated operation program 114. As a result, it is extremely useful in putting it into the practical use.

According to the embodiment, the vehicle condition advise unit 200 warns the driver of the set vehicle condition by the simulation, on the basis of the pedal operating condition of the brake pedal 501. However, the vehicle condition advise unit 200 may warn the driver thereof by the simulation, on the basis of an operation condition of an accelerator pedal or the like.

Further, all the lane deviation warning function, the distance warning function, the condition control function and the brake control function are explained in the vehicle having the functions. However, any functions may be explained in the vehicle. Further, another function may be explained through the vehicle condition advise unit.

Further, it is determined whether to perform the play back program 112 or not, according to the execution judgment program 110. However, the execution judgment program 110 may be not stored, and the Step S1 in the flow chart of FIG. 7 may be omitted.

Further, either one of the first, second or third control patterns 130 to 132 can be selected according to the control selection program 111. However, the control selection program 111 may be not stored, and the Step S2 in the flow chart of FIG. 7 may be omitted.

Further, the vehicle condition advise unit 200 is controlled on the basis of the simulated vehicle condition data 702 and the operating condition of the drive operation unit 500, according to the simulated advise program 113 and the simulated operation program 114. However, the simulated operation program 114 may be not stored, and the vehicle condition advise unit 200 may be controlled on the basis of the simulated vehicle condition data 702, according to only the simulated advise program 113.

Further, the explanation for the manual, for the meter display unit 300, for the lane deviation warning function, for the distance warning function, for the condition control function, for the brake control function, for the failure of the vehicle, and for the cautions are displayed in the order. However, the processes may be explained in any order. Further, any process may be selected and explained.

Further, both the image data and the sound data are stored in the memory 700, and both the image and the sound are outputted when the display unit executes the drive guide data. However, any executions may be stored and outputted. Further, although the existing navigation device 400 is used as the play back unit, another play back device may be provided and display the data stored in the memory.

Further, when the navigation device 400 which is the display unit displays the drive guide data 701, the vehicle condition advise unit 200 warns the driver of the set vehicle condition by the simulation. However, a receiving device for receiving data outputted from an external device, may be provided for the vehicle instead of the play back unit, and the vehicle condition advise unit may be controlled by the simulation, on the basis of the data received by the receiving device or the like. That is, if the simulated alarm control is provided for the vehicle, and if the vehicle condition advise unit can warn the driver of the set vehicle condition by the simulation, the driver can understand the set vehicle condition, experience the alarm operation of the vehicle condition advise unit corresponding to the set vehicle condition by the simulation, and certainly understand the operation of the vehicle condition advise unit concerning each function of the vehicle.

Further, the simulated alarm may be given by using not only the warning lamp, the alarm lamp or the like, controlled by the simulation but also an AT alarm lamp. Furthermore, it should be understood that various changes and modifications on specific details of the structure or the like may be made to the invention without deviating from the gist thereof.

As described above, according to the control system and the control method for onboard equipments of the present invention, the driver can know the alarm operation of the vehicle condition advise unit corresponding to the set vehicle condition by the simulation, and certainly understand the operation of the vehicle condition advise unit concerning each function of the vehicle. Because the driver can drive the vehicle accurately on the basis of the operation of the vehicle condition advise unit when driving the vehicle actually, it is possible to certainly make each function of the vehicle give full effects.

The entire disclosure of Japanese Patent Application No. Tokugan 2002-112011 filed on Apr. 15, 2002 including specification, claims, drawings and abstract are incorporated herein by reference in its entirety.

What is claimed is:

1. A control system for an onboard equipment, comprising:
   a vehicle condition advice unit for advising a driver of a vehicle condition; and
   a simulated advise control unit for simulating an operation of the vehicle condition advice unit based on a simulated set vehicle condition which is set beforehand.

2. A control system for an onboard equipment, comprising:
   a vehicle condition advise unit for informing a driver of a vehicle condition;
   a play back unit for playing back data stored in a memory to inform the driver, the memory for storing drive guide data corresponding to a set vehicle condition which is set beforehand, and simulated vehicle condition data concerning the set vehicle condition; and
   a simulated advise control unit for simulating an operation of the vehicle condition advise unit based on the simulated vehicle condition data when the play back unit executes the drive guide data stored in the memory.

3. The control system as claimed in claim 2, further comprising:
   a drive operation unit operated by the driver; and
   an operation detecting unit for detecting an operation condition of the drive operation unit,
   wherein the simulated advise control unit makes the vehicle condition advise unit inform the driver of the set vehicle condition by the simulation on the basis of the simulated vehicle condition data and the operation condition detected by the operation detecting unit.

4. The control system as claimed in claim 2, wherein the vehicle condition advise unit comprises a lane deviation warning unit for informing the driver that the vehicle deviates from a lane.

5. The control system as claimed in claim 2, wherein the vehicle condition advise unit comprises a distance informing unit for warning the driver that the vehicle approaches an object near the vehicle.

6. The control system as claimed in claim 2, wherein the vehicle condition advise unit comprises a condition control advice unit for warning the driver that a condition control device of the vehicle operates.

7. The control system as claimed in claim 2, wherein the vehicle condition advise unit comprises a brake control alarm unit for warning the driver that a brake control device operates.

8. The control system as claimed in claim 2, wherein the vehicle condition advise unit comprises a meter display unit for being visually confirmed by the driver.

9. The control system as claimed in claim 2, wherein the play back unit comprises an image display back unit,
   the drive guide data include image data, and
   the play back unit outputs the image based on the image data to the image display back unit.

10. The control system as claimed in claim 2, wherein the play back unit comprises a speaker,
    the drive guide data include sound data, and
    the play back unit outputs a sound based on the sound data from the speaker.

11. The control system as claimed in claim 3, further comprising:
    a drive device for making the vehicle a set driving condition on the basis of the operation condition of the drive operation unit; and
    a simulated operation control unit for controlling the drive device on the basis of the simulated vehicle condition data and for controlling the operation condition of the drive operation unit so as to correspond to the set vehicle condition.

12. The control system as claimed in claim 11, wherein the drive operation unit comprises a brake pedal,
    the drive device comprises a brake device for stopping the vehicle on the basis of a pedal operating condition of the brake pedal, and
    the simulated operation control unit comprises a simulated pedal control unit for controlling the brake device on the basis of the simulated vehicle condition data, and controlling the pedal operating condition so as to correspond to the set vehicle condition.

13. A control method for an onboard equipment of a vehicle with a vehicle condition advise unit for advising a driver of a vehicle condition, the control method comprising:
    simulating an operation of the vehicle condition advise unit based on a simulated set vehicle condition which is set beforehand; and
    displaying the simulated set vehicle condition on a display unit.

14. A control method for an onboard equipment of a vehicle comprising a vehicle condition advise unit for informing a driver of a vehicle condition by a play back unit for playing back data stored in a memory to inform the driver, wherein the memory stores drive guide data corresponding to a set vehicle condition which is set beforehand and simulated vehicle condition data concerning the set vehicle condition, the control method comprising:
    making the play back unit display the drive guide data stored in the memory; and
    simulating an operation of the vehicle condition advise unit based on the simulated vehicle condition data when performing the making the play back unit display the drive guide data.

15. The control method as claimed in claim 14, further comprising:
    determining whether to make the play back unit display the drive guide data on the basis of a set determination condition.

16. The control method as claimed in claim 14, wherein the vehicle further comprises a drive operation unit operated by the driver, and an operation detecting unit for detecting an operation condition of the drive operation unit, and
    the control method further comprises making the vehicle condition advise unit inform the driver of the set vehicle condition by the simulation on the basis of the operation condition detected by the operation detecting unit, when performing the making the play back unit play the drive guide data and playing the drive guide data.

17. The control method as claimed in claim 16, further comprising:
    selecting any one of a first control step comprising the making the play back unit play the drive guide data, a second control step comprising the making the play back unit play the drive guide data and the making the vehicle condition advise unit warn the driver of the set vehicle condition by a simulation on the basis of the simulated vehicle condition data, and a third control step comprising the making the play back unit play the drive guide data, the making the vehicle condition advise unit warn the driver of the set vehicle condition by a simulation on the basis of the simulated vehicle condition data and the making the vehicle condition advise unit warn the driver of the set vehicle condition by the simulation on the basis of the operation condition, on the basis of a set selecting condition.

18. The control method as claimed in claim 14, wherein the vehicle condition advise unit comprises a lane deviation warning unit for informing the driver that the vehicle deviates from a lane, and the making the vehicle condition advise unit warn the driver of the set vehicle condition by a simulation on the basis of the simulated vehicle condition data includes making the lane deviation warning unit inform the driver of the set vehicle condition by the simulation on the basis of the simulated vehicle condition data.

19. The control method as claimed in claim 14, wherein the vehicle condition advise unit comprises a distance informing unit for warning the driver that the vehicle approaches an object near the vehicle, and the making the vehicle condition advise unit warn the driver of the set vehicle condition by a simulation, on the basis of the simulated vehicle condition data includes making the distance informing unit warn the driver of the set vehicle condition by the simulation, on the basis of the simulated vehicle condition data.

20. The control method as claimed in claim 14, wherein the vehicle condition advise unit comprises a condition control advise unit for warning the driver that a condition control device of the vehicle operates, and the making the vehicle condition advise unit warn the driver of the set vehicle condition by a simulation, on the basis of the simulated vehicle condition data includes making the condition control advise unit warn the driver of the set vehicle condition by the simulation, on the basis of the simulated vehicle condition data.

21. The control method as claimed in claim 14, wherein the vehicle condition advise unit comprises a brake control alarm unit for warning the driver that a brake control device of the vehicle operates, and the making the vehicle condition advise unit warn the driver of the set vehicle condition by a simulation, on the basis of the simulated vehicle condition data includes making the brake control alarm unit warn the driver of the set vehicle condition by the simulation, on the basis of the simulated vehicle condition data.

22. The control method as claimed in claim 14, wherein the vehicle condition advise unit comprises a meter display unit for being visually confirmed by the driver, and the making the vehicle condition advise unit warn the driver of the set vehicle condition by a simulation, on the basis of the simulated vehicle condition data includes making the meter display unit warn the driver of the set vehicle condition by the simulation, on the basis of the simulated vehicle condition data.

23. The control method as claimed in claim 14, wherein the play back unit comprises an image display unit, the drive guide data include image data, and the making the play back unit play the drive guide data includes outputting the image data stored in the memory to the image display back unit.

24. The control method as claimed in claim 14, wherein the play back unit comprises a speaker, the drive guide data include sound data, and the making the play back unit play the drive guide data includes outputting the sound data stored in the memory from the speaker.

25. The control method as claimed in claim 16, wherein the vehicle further comprises a drive device for making the vehicle a set driving condition on the basis of the operation condition of the drive operation unit, and the control method comprises controlling the drive device on the basis of the simulated vehicle condition data and for controlling the operation condition of the drive operation unit so as to correspond to the set vehicle condition, when performing the making the play back unit play the drive guide data and playing the drive guide data.

26. The control method as claimed in claim 25, wherein the drive operation unit comprises a brake pedal, the drive device comprises a brake device for stopping the vehicle on the basis of a pedal operating condition of the brake pedal, and the controlling the drive device comprises controlling the brake device on the basis of the simulated vehicle condition data, and controlling the pedal operating condition so as to correspond to the set vehicle condition, when performing the making the play back unit play the drive guide data and playing the drive guide data.

27. A control method for an onboard equipment of a vehicle, comprising:

warning a driver of a vehicle condition; and simulating the warning of the vehicle condition based on a simulated set vehicle condition which is set beforehand.

28. A control method for an onboard equipment of a vehicle, comprising:

warning a driver of a vehicle condition;

playing data stored in a memory to warn the driver, the memory for storing drive guide data corresponding to a set vehicle condition which is set beforehand and simulated vehicle condition data concerning the set vehicle condition; and simulating the warning of the vehicle condition based on the simulated vehicle condition data, when playing the drive guide data stored in the memory.

* * * * *